US007168266B2

(12) United States Patent
Chen et al.

(10) Patent No.: US 7,168,266 B2
(45) Date of Patent: Jan. 30, 2007

(54) PROCESS FOR MAKING CRYSTALLINE STRUCTURES HAVING INTERCONNECTED PORES AND HIGH REFRACTIVE INDEX CONTRASTS

(75) Inventors: Gang Chen, New Providence, NJ (US); Ronen Rapaport, Chatham, NJ (US); Elsa Reichmanis, Westfield, NJ (US); Shu Yang, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 502 days.

(21) Appl. No.: 10/383,150

(22) Filed: Mar. 6, 2003

(65) Prior Publication Data

US 2004/0172973 A1    Sep. 9, 2004

(51) Int. Cl.
C03B 19/12    (2006.01)
(52) U.S. Cl. ............................... 65/17.2; 65/23; 65/31; 204/157.41; 204/157.61; 264/628
(58) Field of Classification Search ................ 65/17.2, 65/23, 31; 204/157.41, 157.61; 264/628
See application file for complete search history.

(56) References Cited

U.S. PATENT DOCUMENTS

| | | | |
|---|---|---|---|
| 4,812,236 A | * | 3/1989 | Ehrsam ...................... 210/490 |
| 5,248,734 A | | 9/1993 | Ober et al. |
| 5,348,687 A | | 9/1994 | Beck et al. |
| 5,383,512 A | * | 1/1995 | Jarvis .......................... 164/46 |
| 5,665,527 A | | 9/1997 | Allen et al. |
| 5,922,299 A | | 7/1999 | Bruinsma et al. |
| 5,948,470 A | | 9/1999 | Harrison et al. |
| 6,027,666 A | | 2/2000 | Ozin et al. |
| 6,319,427 B1 | | 11/2001 | Ozin et al. |
| 6,329,070 B1 | | 12/2001 | Sass et al. |
| 6,379,874 B1 | | 4/2002 | Ober et al. |
| 6,387,453 B1 | | 5/2002 | Brinker et al. |
| 6,409,907 B1 | | 6/2002 | Braun et al. |

(Continued)

FOREIGN PATENT DOCUMENTS

WO    WO 01/31404    5/2001

(Continued)

OTHER PUBLICATIONS

Campbell et al., Replication and Compression of Bulk and Surface Structures with Polydimethylsiloxane Elastomer, J. Chem. Ed., Apr. 1999, pp. 537-541, vol. 75, No. 4.

(Continued)

*Primary Examiner*—Sean Vincent

(57) ABSTRACT

Techniques for producing a glass structure having interconnected macroscopic pores, employing steps of filling polymerizable glass precursors into pores in a polymeric structure having interconnected macroscopic pores; polymerizing the precursors; and decomposing the polymers to produce a glass oxide structure having interconnected macroscopic pores. Further techniques employ steps of exposing portions of a photosensitive medium including glass precursors to an optical interference pattern; polymerizing or photodeprotecting the exposed portions and removing unpolymerized or deprotected portions; and decomposing the polymerized or deprotected portions to produce a glass structure having interconnected macroscopic pores. Techniques for filling pores of such glass structure with a material having a high refractive index, and for then removing the glass structure. Structures can be produced having interconnected macroscopic pores and high refractive index contrasts, which can be used, for example, as photonic band gaps.

20 Claims, 12 Drawing Sheets

U.S. PATENT DOCUMENTS

| | | | |
|---|---|---|---|
| 6,465,387 | B1 | 10/2002 | Pinnavaia et al. |
| 6,471,761 | B2 | 10/2002 | Fan et al. |
| 6,747,123 | B2* | 6/2004 | Chen et al. ............... 528/480 |
| 7,008,757 | B2 | 3/2006 | Reichmanis et al. ........ 430/322 |
| 2003/0129501 | A1* | 7/2003 | Megens et al. ................ 430/1 |
| 2004/0115566 | A1* | 6/2004 | Reichmanis et al. ........ 430/322 |

FOREIGN PATENT DOCUMENTS

| | | |
|---|---|---|
| WO | WO 01/42540 | 6/2001 |
| WO | WO 01/51990 | 7/2001 |

OTHER PUBLICATIONS

Jahns et al., Microoptics for Biomedical Applications, American Biotechnology Laboratory, Oct. 2000, pp. 52, 54, No. 18.

Kruk et al., Mesoporous Silicate—Surfactant Composites with Hydrophobic Surfaces and Tailored Pore Sizes, J. Phys. Chem. B., Aug. 29, 2002, pp. 10096-10101. vol. 106, No. 39, Publisher: American Chemical Society.

Lee et al., Tunable Inverse Opal Hydrogel pH Sensors, Adv. Mater., Apr. 17, 2003, pp. 563-566, vol. 15, No. 7-8.

Leister Microsystems, Micro-optics: Imagine the Future of Light. Sep. 2001, 4 pages.

Stokes et al., Detection of *E. coli* Using a Microfluidics-Based Antibody Biochip Detection System, Fresenius J. Anal. Chem., 2001, pp. 295-301, vol. 369.

Wu et al., Reduction Photolithography Using Microlens Arrays: Applications in Gray Scale Photolithography, Analytical Chemistry, Jul. 15, 2002, pp. 3267-3273, vol. 74, No. 14.

Zhang et al., Materials and Techniques for Electrochemical Biosensor Design and Construction, Biosensors & Bioelectronics, 2000, pp. 273-282, vol. 15.

Sundararajan et al., "Supercritical $CO_2$ Processing for Submicron Imaging of Fluoropolymers," Chemistry of Materials, vol. 12, No. 1, Jan. 2000, pp. 41-48.

Turberfield, "Photonic Crystals Made by Holographic Lithography," MRS Bulletin, Aug. 2001, pp. 632-636.

Campbell et al., "Fabrication of Photonic Crystals for the Visible Spectrum by Holographic Lithography," Nature, vol. 404, Mar. 2, 2000, pp. 53-56.

Ho et al., "Existence of a Photonic Gap in Periodic Dielectric Structures," Physical Review Letters, vol. 65, No. 25, Dec. 17, 1990, pp. 3152-3155.

Ozbay et al., "Measurement of a Three-Dimensional Photonic Band Gap in a Crystal Structure Made of Dielectric Rods," Physical Review B, vol. 50, No. 3, Jul. 15, 1994, pp. 1945-1948.

Turberfield, "Photonic Crystals Made by Holographic Lithography," Abstract from Symposium k, Microphotonics-Materials, Physics, and Applications, Nov. 26-29, 2001.

Shoji et al., "Photofabrication of Three-Dimensional Photonic Crystals by Multibeam Laser Interference into a Photopolymerizable Resin," Applied Physics Letters, vol. 76, No. 19, May 8, 2000, pp. 2668-2670.

Kresge et al., "Ordered Mesoporous Molecular Sieves Synthesized by a Liquid-Crystal Template Mechanism," Nature, vol. 359, Oct. 1992, pp. 710-712.

Tanev et al., "A Neutral Templating Route to Mesoporous Molecular Sieves," Science, vol. 267, Feb. 1995, pp. 865-867.

Huo et al., "Generalized Synthesis of Periodic Surfactant/Inorganic Composite Materials," Nature, vol. 368, pp. 317-321.

Sanchez et al., "Design and Properties of Hybrid Organic-Inorganic Nanocomposites for Photonics." MRS Bulletin, May 2001, pp. 377-387.

Yang et al., "Hierarchically Ordered Oxides," Science, vol. 282, Dec. 1998, pp. 2244-2246.

Templin et al., "Organically Modified Aluminosilicate Mesostructures from Block Copolymer Phases," Science, vol. 278, Dec. 1997, pp. 1795-1798.

Raman et al., "Template-Based Approaches to the Preparation of Amorphous, Nanoporous Silicas," Chemical Materials, vol. 8, Feb. 1996, pp. 1682-1701.

Yang et al., "Block Copolymer Templating Synthesis of Mesoporous Metal Oxides with Large Ordering Lengths and Semicrystalline Framework" Chemical Materials, vol. 11, 1999, pp. 2813-2826.

Brinker et al., "Evaporation-Induced Self-Assembly: Nanostructures Made Easy," Advanced Materials, vol. 11, 1999, pp. 579-585.

Chan et al., "Ordered Bicontinuous Nanoporous and Nanorelief Ceramic Films from Self Assembling Polymer Precursors," Science, vol. 286, Nov. 26, 1999, pp. 1716-1719.

Young, "Organic-Inorganic Monomers," accessed at http://www.psrc.unm.edu/mauritz/nano2.html, Jul. 8, 2002.

Yang et al., "Creating Periodic Three-Dimensional Structures by Multibeam Interference of Visible Laser," Chemistry of Materials, vol. 14, No. 7, Jul. 2002, pp. 2831-2833.

Vlasov et al., "On-Chip Natural Assembly of Silicon Photonic Bandgap Crystals," Nature, vol. 414, Nov. 15, 2001, pp. 289-293.

Baney et al., "Silsesquioxanes." American Chemical Society, 1995, pp. 1409-1430.

The Witteman Company, "Carbon Dioxide," accessed at http://www.witteman.com/co2.htm, Dec. 4, 2002.

"Sol-Gel Chemistry," accessed at http://www.sol-gel.com/chemi.htm, Dec. 9, 2002.

Campbell et al., "Uses of Polydimethylsiloxane (PDMS) Elastomer," accessed at http://mrsec.wisc.edu/edetc/PDMS, Jul. 8, 2002.

Shishido et al., "Direct Fabrication of Two-Dimensional Titania Arrays Using Interference Photolithography," Applied Physics Letters, vol. 79, No. 20, Nov. 12, 2001, pp. 3332-3334.

Avgeropoulos et al., "Synthesis and Morphological Behavior of Silicon-Containing Triblock Copolymers for Nanostructure Applications," Chemical Materials, vol. 10, No. 8, 1998, pp. 2109-2115.

* cited by examiner

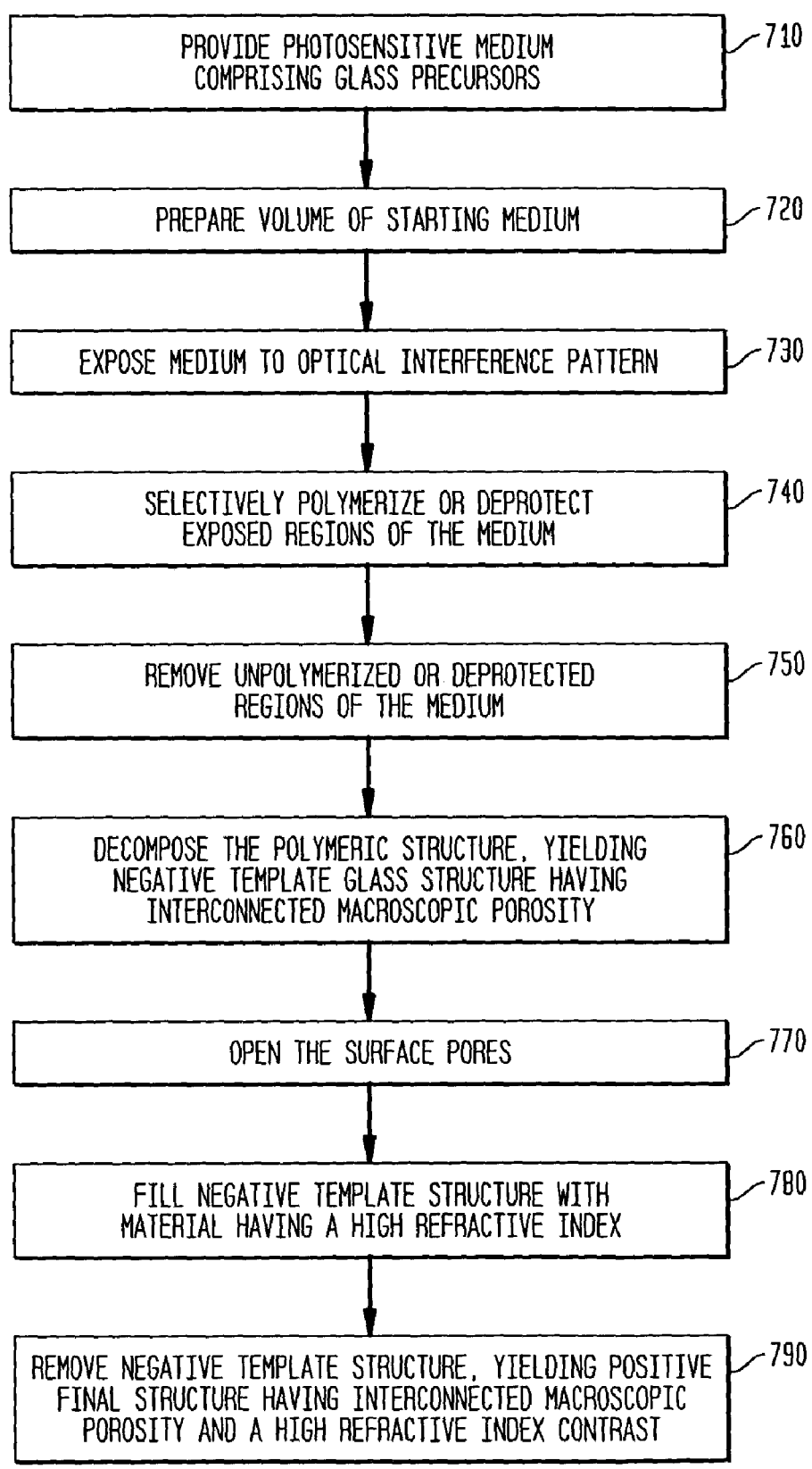

810

820

830

PROCESS FOR MAKING CRYSTALLINE STRUCTURES HAVING INTERCONNECTED PORES AND HIGH REFRACTIVE INDEX CONTRASTS

FIELD OF THE INVENTION

The present invention generally relates to improvements in the field of materials having high refractive index contrasts and open, interconnected pores. These materials are useful for fabrication of photonic band gap structures and other structures taking advantage of such porosity. More particularly, the present invention addresses advantageous techniques for producing negative template periodic porous glass molds that can withstand the high temperatures necessary to fill the negative template pores with a material having a high refractive index, to create a positive final structure having interconnected macroscopic pores.

BACKGROUND OF THE INVENTION

A photonic crystal is a periodically structured composite material, with a unit cell whose dimensions are on the order of a wavelength of visible to infrared light. Such dimensions may broadly range from about 50 nanometers (nm) to about 10 micrometers ($\mu$m), and preferably are smaller than one $\mu$m. These dimensions may be suitable, for example, to generate a photonic band gap useful with wavelengths between about 600 nm and about 1.65 $\mu$m, and more particularly, for example, wavelengths such as 1.3 $\mu$M and 1.55 $\mu$m as typically used in optical communications. Such a crystal is made from two constituent materials whose refractive indices greatly differ, such that the contrast ratio between them generally is at least 2:1. Three-dimensional (3D) photonic crystals typically consist of interpenetrating networks of dielectric material and air, the latter serving as the material of relatively low refractive index.

The defining characteristic of a photonic crystal is a range of frequencies within which no propagating electromagnetic modes exist. Multiple interference between waves scattered from each unit cell of the crystalline structure can open a photonic band gap. A photonic band gap is a range of frequencies, analogous to the electronic band gap of a semiconductor, within which no propagating electromagnetic modes exist. Structural defects in a photonic crystal may give rise to spatially localized electromagnetic modes, or microcavity-confined modes, at energies within the gap. Waveguides are formed by coupling such defects together. A waveguide operating at a frequency within a photonic band gap cannot leak, because there are no propagating electromagnetic modes in the surrounding photonic crystal capable of carrying energy away. In principle, this absence of leakage allows the fabrication of waveguides that turn corners in a distance on the order of the optical wavelength, requiring two orders of magnitude less space than semiconductor ridge waveguides currently used in integrated optics, which typically have a minimum bend radius greater than 100 $\mu$m.

Photonic band gap crystals can form the basis for miniaturized integrated optical circuits with length scales comparable with those of integrated electronics. Such crystals can serve, for example, as waveguides, splitters, optical insulators, optical filters, microcavity lasers, optical switches, routers, and in other photonic band gap applications. They can be designed to optically act on either a one dimensional (1D), two dimensional (2D) or 3D level. Such engineering applications require fabrication technologies for the cheap and rapid production of periodic structures that have the potential to incorporate engineered structural defects to create microcavities and waveguides. Other applications for these structures include uses as filters, catalysts, and biocompatible materials.

Despite the broad potential utility of materials having interconnected porous structures having sub-micron periodicity and high refractive index contrasts, conventional technologies are found difficult to provide cost effective methods of making them. According to one conventional method referred to as "log-piling," layers of uniformly spaced grid elements formed, of a high refractive index material are painstakingly stacked together by serial lithography and etching. Although this method can produce a functional photonic band gap structure, such processing is labor and time intensive and therefore impractical for commercialization. Moreover, sufficiently accurate mutual registration of the layers is difficult to achieve, and control of the contours of the grid elements is limited. A variation of this method, involving fusion of successive prefabricated grid wafers, generates similar problems. Another tedious method for fabricating band gap structures involves drilling holes in a solid block of high refractive index material, by using a laser for example.

Further methods used to make crystalline structures having interconnected macroscopic porosity have involved creating a negative template mold into which a material having a high refractive index, or its precursor, is then filled. The negative template mold is then decomposed, for example by oxidation, to produce a positive final porous structure with high index contrast. These methods include various processes involving exposure of a material to a light pattern with light and dark regions, producing a void-filled structure. The resulting structures are referred to as positive tone structures if the voids occupy regions that were exposed to light regions of the light pattern. The resulting structures are referred to as negative tone structures if the voids occupy regions that were dark regions of the light pattern.

One group of methods used to make negative template molds for crystalline structures having macroscopic porosity has depended on chemical self-assembly techniques. For example, one of these methods involves self-assembly of colloids by sedimentation, forming a face-centered cubic lattice. Drawbacks to such a methodology include the prevalence of undesired lattice defects such as stacking faults, and the inability to obtain lattice types other than face-centered cubes and to otherwise control lattice parameters other than the colloid cell diameter. Another chemical self-assembly method involves selective decomposition of one block in a block copolymer to leave controlled porosity after processing. Cylinder and gyroid lattices can be produced by this method. However, lattice defects are prevalent, and pore size typically is less than 100 nm. Two-photon polymerization can be used to write periodic structures with different lattice constants. However, it is a rather slow point-wise writing process.

Holographic lithography is a method that has been successfully used to make a polymeric negative template mold suitable for producing a crystalline structure having interconnected macroscopic porosity. According to this method, a photosensitive material, for example, a film of a desired thickness, is subjected to an optical interference pattern resulting from multiple beam interference. The material can then be selectively polymerized or deprotected in regions where the film is exposed to the interfered optical signals. After subsequent development using a suitable solvent, a porous 2D or 3D template is obtained. Among the advantages of holographic lithography are an ability to select the porous structure's lattice constants, an ability to produce crystalline structures free of unintended defects, and the availability of inexpensive commercial means for implementation.

However, efforts to effectively use such a negative template polymeric mold to produce a positive final crystalline structure having a high refractive index contrast have not been entirely successful. Titanium tetraethoxide has, for example, been filled into such molds in sol-gel form. However, complete filling of such a mold may be problematic due to pore-clogging. Moreover, the refractive index of titanium dioxide upon decomposition of the negative- and positive-template organic components is only 2.0 to 2.4 on a scale in which air has a refractive index of 1.0, which is near the low end of about 2.0 for photonic band gap utility. In a related method, materials having refractive indices of less than 3, such as cadmium sulfide and cadmium selenide, have been electroplated into a polymer mold. However, the range of compounds suitable for electroplating is limited.

High temperature methods involving gas phase deposition, such as chemical vapor deposition (CVD), would be effective for filling a material of high refractive index, such as elemental silicon, into a mold. However, a polymer mold such as those discussed above clearly cannot withstand the temperatures of 400° C. or more, and often 500° C. or more, necessary to create the chemical vapor. In one effort to resolve this problem, sea urchin skeletons were used as negative template molds and filled with polydimethylsiloxane (PDMS) oligomers, which can be polymerized to solid form and then oxidized to silicon dioxide glass. However, this method necessarily depends on the irregular structure of a natural sea urchin skeleton to determine the mold structure, allowing no control over the uniformity, size, contours or interconnectivity of the pores. In general, the porosity resulting from such sea urchin based methods is on the order of about 20 to about 100 μm, far above the micron range. Moreover, photonic band gap structures require introduction of precisely positioned point defects to provide waveguide pathways through the otherwise non-propagating material, the introduction of which cannot be controlled by using sea urchin skeletons as negative template molds.

Accordingly, there is a need for a process for the production of negative template porous molds that can be used to produce positive final crystalline structures fabricated from materials having a high refractive index and having interconnected macroscopic pores.

SUMMARY OF THE INVENTION

The present invention provides methods for producing negative template porous glass molds suitable for production of positive final structures having an interconnected macroporous crystalline structure. Macroscopic pores are defined as pores that are larger than about 500 angstroms in diameter. The negative template glass molds can withstand the high temperatures necessary to fill the negative template pores by CVD or an alternative high temperature process, with a material having a high refractive index to create the positive final porous structure. In one embodiment, the negative template mold so produced is constituted by silicon dioxide ($SiO_2$) or other glass. The present invention provides methods for making such negative template molds either directly from glass precursors, or indirectly from a positive template polymeric mold. The present invention further provides methods for using the negative template molds to produce positive final porous structures having high refractive index contrasts and interconnected macroscopic pores. The present invention further provides crystalline structures having interconnected macroscopic pores and high refractive index contrasts, substantially uniform pore lattices in predefined patterns, and point defects at predetermined locations to provide optical propagation pathways.

According to one embodiment, the present invention provides a method of producing a glass structure having interconnected macroscopic pores. The method comprises the steps of: providing a polymeric structure having interconnected macroscopic pores; providing polymerizable glass precursors; filling pores in said polymeric structure with said polymerizable glass precursors; polymerizing said polymerizable glass precursors to yield a filled polymeric structure; and decomposing said filled polymeric structure to produce a glass structure having interconnected macroscopic pores.

According to another embodiment, the present invention provides a method of producing a glass structure having interconnected macroscopic pores comprising the steps of: providing a photosensitive medium comprising glass precursors; exposing said medium to an optical interference pattern; polymerizing or deprotecting the portions of said medium exposed to said optical interference pattern, leaving other unpolymerized or protected portions; removing unpolymerized or deprotected portions of said medium; and decomposing said medium to produce a glass structure having interconnected macroscopic pores.

In further embodiments, such methods further comprise the step of filling pores of said glass structure with a material having a high refractive index to yield an interpenetrating structure. In additional embodiments, such methods further comprise the step of removing said glass structure from said interpenetrating structure.

A more complete understanding of the present invention, as well as other features and advantages of the present invention, will be apparent from the following detailed description and the accompanying drawings.

BRIEF DESCRIPTION OF THE DRAWINGS

FIG. 7 is a flow chart of another method for producing structures having interconnected macroscopic pores according to the present invention;

DETAILED DESCRIPTION

Figure 1:
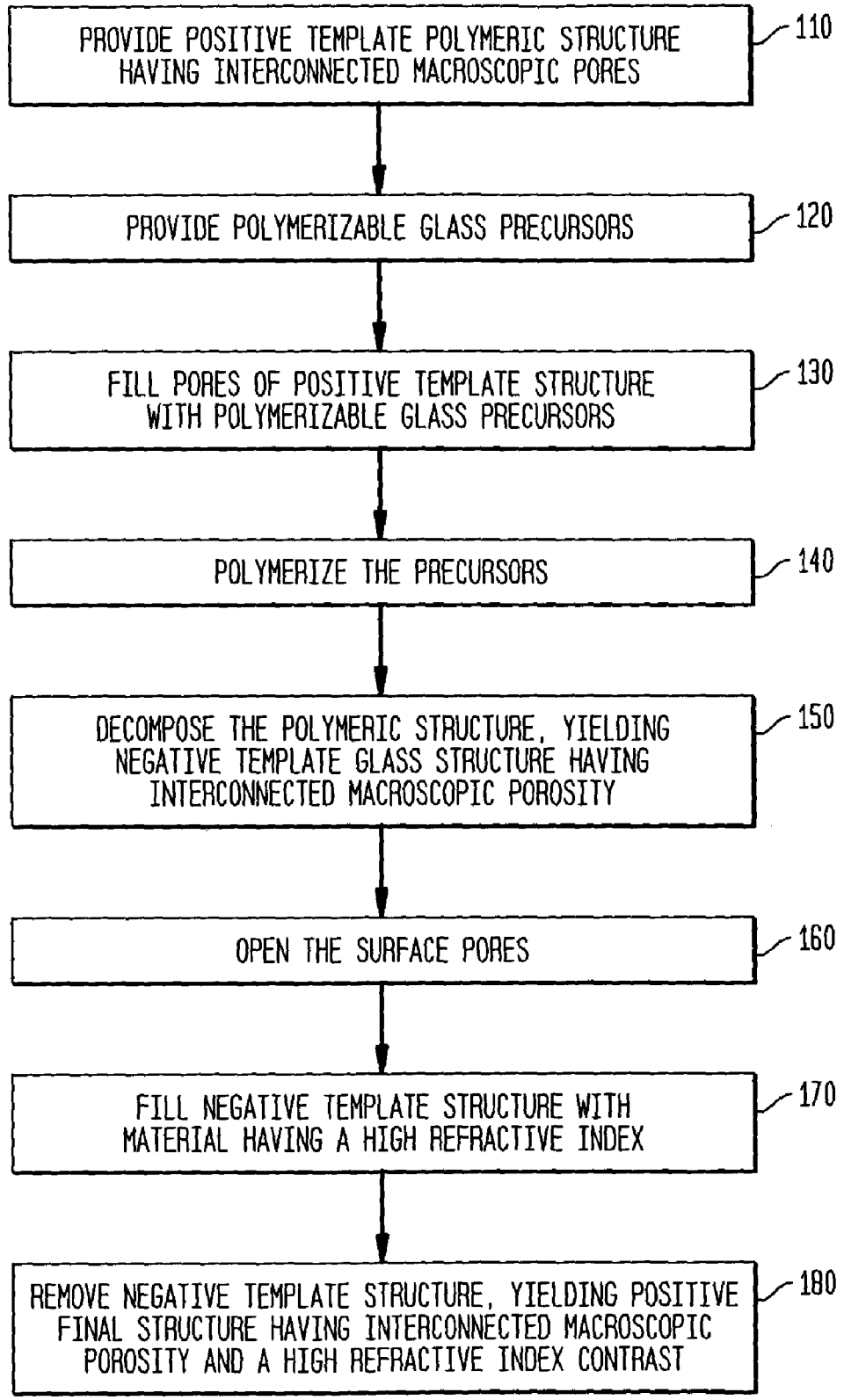
FIG. 1 is a flow chart of a method for producing structures having periodic interconnected macroscopic pores according to the present invention.

The present invention provides methods of producing a negative template mold, having an interconnected macroscopic porous structure that can withstand the high temperatures necessary to fill the pores by CVD or other high temperature process, with a material having a high refractive index to create a positive final porous structure. The present discussion will principally address these product structures in the context of their utility as photonic band gap structures, but it will be understood that these structures have other end-use applications as well.

According to one embodiment, a negative template mold is prepared by filling an organic polymeric positive template mold having interconnected macroscopic pores, with a polymerizable precursor to the formation of $SiO_2$ or other glass. After polymerization of the precursor, the positive template organic polymer mold is removed, and the precursor is converted to glass to constitute the desired negative template mold.

In order to produce the organic polymeric positive template mold for this embodiment, a photosensitive starting medium (starting medium), for example, is first provided. The starting medium is a photoresist, and includes photo-sensitizer molecules and a photosensitive material, uniformly dispersed in a solvent. The photosensitive material can be in the form of monomers, oligomers, polymers or mixtures. The photo-sensitizer molecules initiate polymerization or deprotection of the starting medium, directly or indirectly, upon exposure to light having an effective wavelength. For example, upon such exposure to light, the photo-sensitizer molecules can initiate sequences of photo-chemical reactions. During post-exposure baking, the products of the photo-chemical reactions then catalyze chemical reactions including polymerization of the monomers and oligomers, as well as deprotection of reactive sites and crosslinking of functional groups in polymers.

A suitable starting medium is provided, for example by spin coating or casting a film of the starting medium on a rigid substrate. The film may have a thickness, for example, of about 1 μm to about 100 μm or more. The film is then prebaked to evaporate out the solvent, at a temperature too low to prematurely induce substantial polymerization or decomposition. For example, temperatures below about 100° C. can be used.

The starting medium is then exposed to a 2D or 3D optical interference pattern produced by combining a plurality of mutually coherent beams of light of a particular wavelength having predefined periodic intensity variations. Such variations are programmed to define regions of interconnected macroscopic porosity having a defined periodic lattice structure to yield a crystalline structure having photonic band gap properties. A 3D optical interference pattern can be used to produce a structure having 3D optical band gap properties. A 2D pattern yields a crystalline structure having 2D optical band gap properties. The periodic regions of intensity generated by the interference pattern cause localized activation of the dispersed photo-sensitizer molecules, thereby causing, directly or indirectly, localized polymerization or photo-deprotection of the photosensitive material.

In one embodiment, a photo-sensitizer is locally activated by such 3D interference pattern, but does not cause such localized polymerization or deprotection of starting medium until a separate step later occurs, such as heating of the material in the presence of the activated photo-sensitizer. In this manner, the 3D interference exposure can be completed before any polymerization or deprotection occurs. Such polymerization or deprotection during exposure changes the localized density of the starting medium, changing its refractive index and distorting incident light. Hence, by delaying the polymerization or deprotection to a step separate from exposure to the optical interference pattern, distortions in the desired pattern of localized activation of the photo-sensitizer can be avoided. Alternatively, the 3D interference exposure can be delivered in a pulsed, non-continuous mode, which can also reduce such distortions.

A two-photon point-writing process can then be used to introduce desired point defects. Next, depending on the type of polymerizable material and photo-sensitizer employed, the selective polymerization or deprotection of the intended portions of the exposed starting medium is completed.

Following selective polymerization or deprotection of the exposed starting medium, the unpolymerized or deprotected portions of the monomers, oligomers and polymers are removed by a solvent exchange step, yielding the desired positive template mold.

The above discussion is exemplary of methods that can be used to produce a positive template polymeric structure having interconnected macroscopic pores. Further details regarding suitable methods for producing such positive template polymeric crystalline structures are disclosed in Megens et al., U.S. patent application Ser. No. 10/040,017, filed on Jan. 4, 2002, entitled "Fabricating Artificial Crystalline Structures," the entirety of which is hereby incorporated by reference.

Such a positive template polymeric structure having interconnected macroscopic pores, a substantially uniform pore lattice in a predefined pattern, and point defects at predetermined locations, can then be used to prepare a negative template mold according to the methods of the present invention.

According to one embodiment illustrated in FIG. 1, the present invention provides a method of using such a positive template polymeric structure to produce a negative template mold, having an interconnected macroscopic porous crystalline structure, that can withstand the high temperatures necessary to fill its pores by CVD or other high temperature process with a material having a high refractive index. Such CVD filling then creates a positive final crystalline structure having both the desired porosity and desired high refractive index contrast.

More particularly, FIG. 1 illustrates a method 100 for using such a positive template polymeric structure, provided at step 110 and having interconnected macroscopic pores, according to the present invention to produce first a negative template mold and then a positive final crystalline structure having interconnected macroscopic pores with high refractive index. Although FIG. 1 broadly relates to polymerizable glass precursors, the discussion below is directed to the exemplary use of silicon or silicone (silicone(e))-containing precursors.

According to this method, polymerizable silicon-containing precursors are prepared at step 120. Such precursors can either themselves be polymerizable, or they can be dispersed in a polymerizable material. Polymerizable silicon-containing materials broadly include silicon (e)-containing monomers and oligomers having two or more functional groups for potential reaction to form polymerization bonds. Monomers having only one potential reactive site can also be bound into polymerizable materials if desired, but they themselves cause chain termination. Polymerizable materials may, if desired, contain only silicon, carbon, hydrogen and oxygen. In general, the polymerizable material needs the capability of polymerization to a solid state.

Although this discussion is directed to exemplary precursors to formation of $SiO_2$, it is to be understood that precursors to other glass compositions can be substituted. For example, precursors to a doped $SiO_2$ composition, or to a glass composition excluding silicon, can be used. The glass composition to be produced preferably is thermally stable at least to about 500° C. to facilitate CVD or other high temperature process for deposition of the high refractive index material, and preferably can be attacked and removed by etching with a suitable solvent such as hydrofluoric acid (HF).

Suitable polymerizable silicon-containing materials include, for example, inorganic-organic silicon(e)-containing monomers in which silicon is bonded directly or indirectly to reactive organic groups. These monomers, when condensed together into oligomers, form organic-inorganic siloxane materials. Exemplary types of inorganic-organic silicon-containing monomers include organically modified silicate (ormosil) monomers, and silsesquioxane monomers. Ormosil monomers include or are typically produced from tetrafunctional silicone alkoxides such as tetraethylorthosilicate (TEOS), also known as tetraethoxysilane, shown in Formula 1.

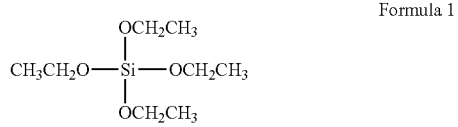

Formula 1

Figure 2:
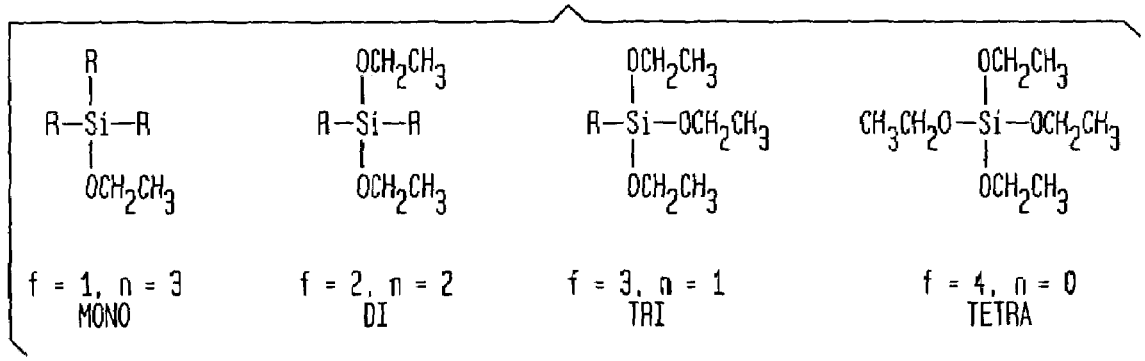
FIG. 2 shows various silicon alkoxides that can be used according to the methods of the present invention.

As shown in FIG. 2, organic modifications of TEOS may take place at any one or more of its four reactive alkoxide ligands. In FIG. 2, f is representative of the number of reactive alkoxy ligands connected to the silicon atom, and n is representative of the number of non-reactive organic moieties connected to the silicon atom. R can be any saturated or unsaturated, linear or branched, aliphatic or aromatic hydrocarbon moiety including, for example, methyl or benzyl. For a mono-functional silicon alkoxide in which f=1 and n=3, the bound monomer terminates the polymer chain since there is only one reaction site. A di-functional silicon alkoxide in which f=2 and n=2, behaves as a bridging agent, connecting monomers in a linear fashion. A tri-functional silicon alkoxide in which f=3 and n=1, behaves as an crosslinker, allowing for branching in the polymerization network. A tetra-functional silicon alkoxide in which f=4 and n=0, also behaves as a networking agent, allowing for maximized connectivity through all four functional groups of the monomer. Ormosils are discussed here in the context of exemplary reactive ethoxide ligands. However, it will be recognized that other reactive groups, including other alkoxide groups, can be used.

Figure 3:
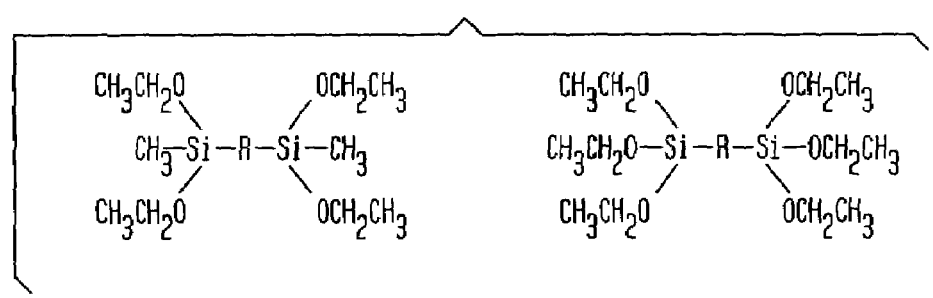
FIG. 3 shows various silsesquioxanes that can be used according to the methods of the present invention.

The second common exemplary type of inorganic-organic silicon-containing precursors are silsesquioxanes. Exemplary general structures of silsesquioxane-type precursors are shown in FIG. 3. The R group is a hydrocarbon substituent that behaves as a spacer unit residing between two reactive mono-, di- or tri-alkoxysilane end groups. Exemplary spacer R groups are methyl and benzyl groups, but other saturated or unsaturated, linear or branched, aliphatic or aromatic hydrocarbon moieties can be used. In one embodiment, partially condensed silsesquioxane oligomers having an average molecular weight of about 500–20,000 grams per mole are used. Suitable silsesquioxanes include GR630S, commercially available from Techneglas, Perrysburg, Ohio. Further background information is disclosed in Chemical Review, vol. 95, pages 1409–1430, (1995), the entirety of which is hereby incorporated by reference.

In a further embodiment, inorganic silicon-containing compounds may be dispersed in a polymerizable material selected from monomers and oligomers having two or more ligands for potential reaction to form polymerization bonds. For example, particulate $SiO_2$ or other glass can be dispersed in such a polymerizable material. The inorganic silicon-containing compound is physically immobilized in the solid polymer upon its polymerization.

Referring again to FIG. 1, at step 130 the pores of the positive template polymeric structure are filled with the polymerizable silicon-containing precursor material. In one embodiment, the viscosity of such precursor material is low in order to facilitate its infiltration into the positive template polymeric mold. For example, the precursor material viscosity may be less than 100 centipoises (CPS) at 25° C. The viscosity of such precursor material can also be reduced by raising its temperature so long as such temperature does not prematurely induce polymerization. Alternatively, pressure or a vacuum may be applied to induce the precursor material to infiltrate the positive template polymeric mold.

Next, the polymerizable silicon-containing precursor material is polymerized to a solid state at step 140. Conventional processes suitable for the chosen precursor material can be used. Elevated temperatures, for example, about 60° centigrade (C.) to about 300° C., or between about 100° C. and about 200° C., maintained for about 1–4 hours, are typically employed.

Figure 4:
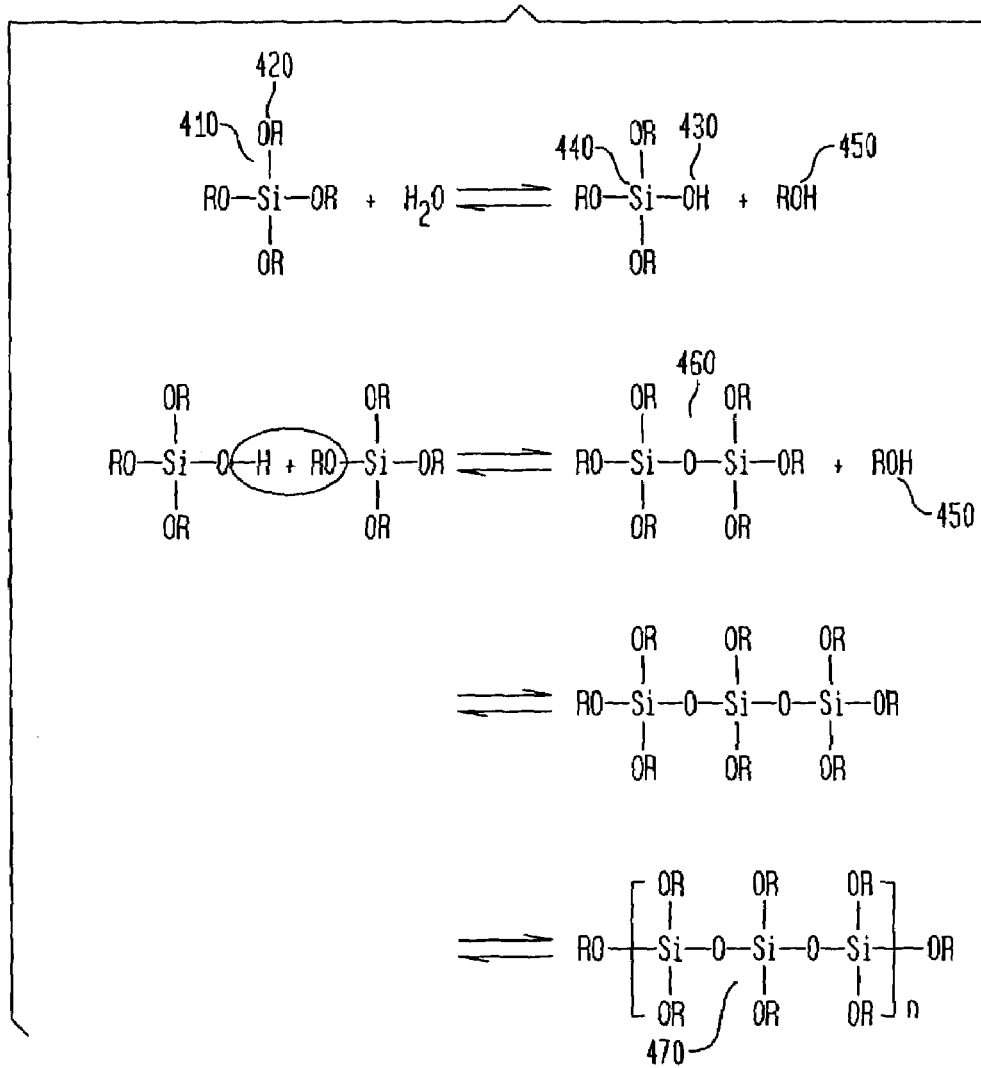
FIG. 4 shows the reaction process for sol-gel polymerization of a tetraalkoxysilane, which can be used according to the methods of the present invention.
Figure 5:
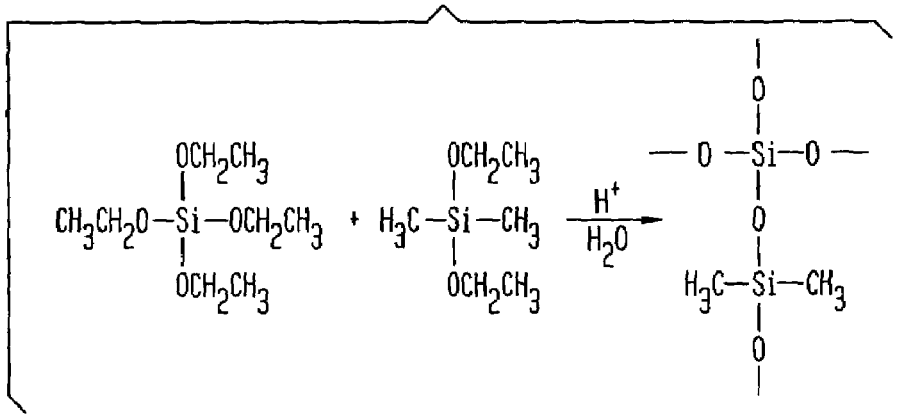
FIG. 5 shows a reaction process for formation of an oligomer by condensation of two silicone-containing alkoxide (ormosil) monomers, such oligomers being useful according to the methods of the present invention.

In one embodiment, ormosil monomers are polymerized by a sol-gel process. FIG. 4 schematically illustrates this process as applied to a tetra-alkoxysilane 410 in which group R represents, for example, methyl or ethyl moieties. R can also be an aromatic group such as, for example, a phenyl moiety. According to this process, an ormosil monomer having two or more reactive alkyloxy ligands 420, such as the illustrated tetra-alkoxysilane 410, is mixed with water. Hydrolysis of alkoxy ligands results in replacement of alkyl moieties by hydrogen. Accordingly, affected alkoxy ligands are converted to hydroxyl groups 430 yielding compound 440, and alkyl alcohols 450 are formed as a reaction byproduct. Next, condensation reactions occur between such hydroxyl groups 430 and further alkoxy ligands 420, yielding ormosil oligomers 460 and further alkyl alcohol byproducts 450. FIG. 5 further illustrates the condensation of two ormosil monomers to produce a silicate oligomer. As shown in FIG. 4, further cycles of hydrolysis and polycondensation then occur, resulting in long chain polymerization of the ormosil monomers yielding polycondensate 470. If ormosil monomers having three or four reactive alkoxy ligands are present, crosslinking through branched chains can also occur.

In another embodiment, silsesquioxane monomers are polymerized by a sol-gel process. Formula 2 illustrates a silsesquioxane oligomer. Upon initial sol-gel network formation, porosity is limited due to the presence of the organic groups. Subsequent decomposition of the polymer yields a well defined porous system including removal of the organic groups. R can be any saturated or unsaturated, linear or branched, aliphatic or aromatic hydrocarbon moiety including, for example, methyl or benzyl.

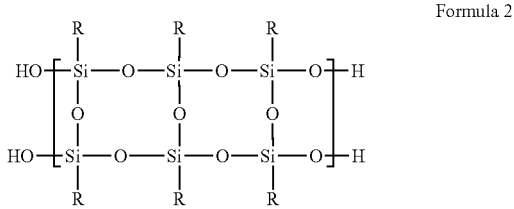

Formula 2

Figure 6:
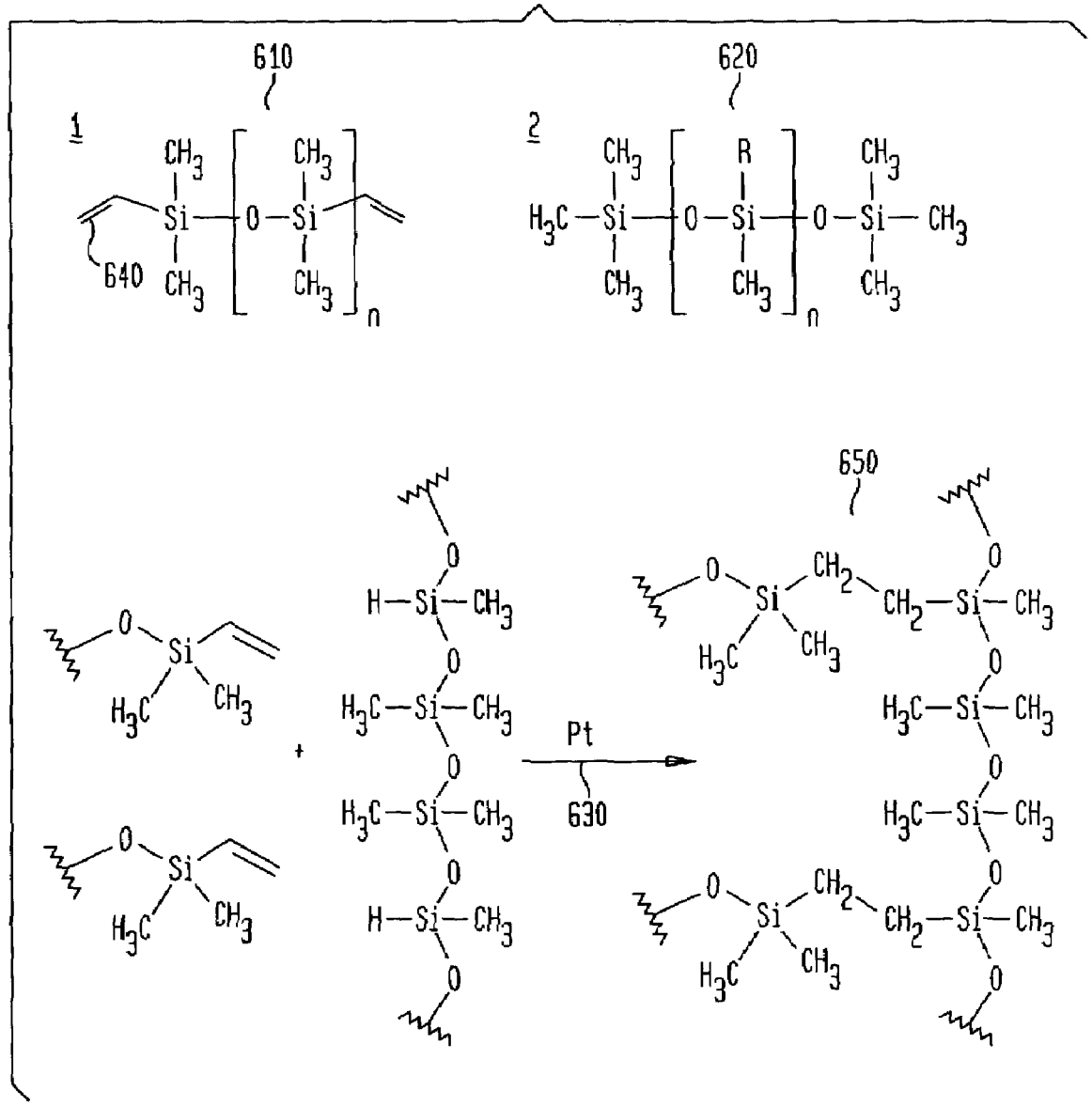
FIG. 6 shows a hydrosilylation reaction process for polymerization of vinyl-terminated siloxane base oligomers and hydride functional siloxane oligomers, the resulting polymerizates being useful according to the methods of the present invention.

In another embodiment, PDMS oligomers are used. PDMS is thermally cured or cured by an organometallic crosslinking reaction. Referring to FIG. 6, vinyl-terminated siloxane base oligomers 610 are provided in which n indicates, for example, about 60 siloxane moieties, and hydride functional siloxane oligomers 620 are provided in which n indicates, for example, about 10 siloxane moieties. R is usually —$CH_3$ and sometimes —H. The crosslinking oligomers 620 each contain at least three silicon hydride bonds, in which R represents hydrogen. The crosslinking oligomers 620 also contain a dispersed platinum-based catalyst 630 that catalyzes the addition of the SiH bond across the vinyl groups 640, forming Si—$CH_2$—$CH_2$—Si linkages 650. For example, the platinum catalyst may be a platinum-divinyltetramethyldisiloxane complex having the formula Pt•1.5 [($CH_2$=CH($CH_3$)$_2$Si]$_2$O). Such catalyst is commercially available as SIP683 1.1 from Gelest Inc., 612 William Leigh Drive, Tullytown, Pa. The multiple reaction sites on both the base oligomers 610 and crosslinking oligomers 620 allow for 3D crosslinking. One advantage of this type of addition reaction is that no waste products such as water are generated. If the ratio of crosslinking oligomer 620 to base oligomer 610 is increased, a harder, more cross-linked elastomer results. One exemplary commercially available product, including separate base and crosslinking agents, is Dow Corning Sylgard elastomer 184.

High temperatures are not required for formation of these polymers, so that the portions of the molecules of the organic reagents not directly affected by the hydrolysis and condensation reactions can be conserved during polymerization. Hence, organic reagents can be chosen to provide additional control over the flexibility of the resulting polymer. Monomers of lower functionality can be included to allow flexible control over chemical densification by creation of specific free volume or porosity in the sol-gel network. Preferably, the polymer has adequate flexibility to avoid cracking, and adequate rigidity to maintain its structural integrity. Excessive flexibility can lead to shrinkage of the structure upon decomposition of the organic components.

The resulting polymerized negative template silicon-containing material is embedded within the positive template silicon-free organic polymer mold. Referring to FIG. 1, oxidation of this structure at step 150 will decompose it and eliminate all of the carbon and hydrogen, leaving behind the silicon in the form of silicon dioxide, or $SiO_2$. Such oxidation can be carried out, for example, by applying to the structure resulting from step 140 either an oxygen plasma, or an elevated temperature in the presence of either oxygen or a mixture of air and oxygen. The robust resulting negative template structure, constituted entirely of refractory $SiO_2$, accordingly has a melting point above 1,000° C. and can easily withstand the temperatures necessary for its use as a mold for CVD or other high temperature deposition of other materials having a high refractive index, to yield a positive final crystalline product structure having interconnected macroscopic pores.

The process of filling the pores of the positive template polymeric structure with silicon-containing precursors at step 130 typically leaves excess silicon deposited at the exterior surfaces of the structure. Following removal of the positive template polymeric structure by its decomposition at step 150, this excess silicon in the form of $SiO_2$ blocks the pores at the exterior surface of the negative template structure. This excess $SiO_2$ is preferably removed at step 160, for example by slightly etching the exterior of the negative template structure. Any composition effective for etching $SiO_2$ can be used. In one embodiment, HF diluted in ethanol or water to a weight percent of about 0.1–10% can be used.

Referring to FIG. 1, the $SiO_2$ negative template porous structure is used as a template at step 170 for CVD or other high temperature filling with a material having a high refractive index. CVD is generally carried out by heating the material to be deposited, to a selected temperature effective for its vaporization. The vaporized material is then directed by suitable means into the negative template structure in order to fill the macroscopic pores. Alternatively, the desired material having a high refractive index can be melted and filled into the porous $SiO_2$ negative template structure. Other suitable high temperature or other processes for filling the negative template structure with the high refractive index material may also be used.

The refractive index of air is 1.0. The material used to create the final positive crystalline structure preferably has a refractive index relative to air of at least about 2.0, more preferably of at least about 2.5, even more preferably of at least about 3.0, and most preferably of at least about 3.4. The difference between the refractive indices of air and the chosen material accordingly is maximized, so that the final positive structure including air-filled interconnected macroscopic pores provides a high refractive index contrast. Where an etching solution is used to dissolve out the negative template mold, the high index material used to create the final positive crystalline structure needs to be resistant to the solution. For example, in the case of a $SiO_2$ negative template mold, the deposited positive final high index material preferably is resistant to HF and ethanol. In one embodiment, the material to be deposited is elemental silicon, having a refractive index of about 3.4 to about 3.6. In another embodiment, the material to be deposited is elemental tellurium, having a refractive index of about 4.0 to about 6.0. In further exemplary embodiments, the material to be deposited is selected from gallium arsenide, gallium nitride, indium phosphide, aluminum nitride, indium nitride, gallium antimonide, indium antimonide, aluminum antimonide, aluminum gallium nitride, aluminum gallium arsenide, aluminum gallium antimonide, gallium aluminum antimonide, indium gallium antimonide, gallium arsenic antimonide, indium gallium phosphide, indium gallium arsenide, indium arsenic antimonide, indium gallium arsenide phosphide, indium aluminum gallium arsenide, indium aluminum gallium nitride, indium aluminum gallium antimonide, lead sulfide, cadmium selenide, tin sulfide, cadmium sulfide, zinc selenide, bismuth, and selenium. Other semiconductors, for example those comprising two or more of the elements selected from the group consisting of gallium, arsenic, indium, phosphorus, aluminum, nitrogen, antimony, lead, sulfur, cadmium, selenium, tin, zinc, and bismuth; or otherwise comprising Group 3, 4, or 5 elements, can also be used.

Referring to FIG. 1, the negative template glass structure is removed at step 180, leaving behind the positive final periodic crystalline structure composed of a high refractive index material containing interconnected macroscopic pores. According to preferred embodiments of the present invention, the macroscopic pores of the final periodic crystalline structure have a pore size between about 50 nanometers and about 10 microns. More preferably, the macroscopic pores of the final positive periodic crystalline structure have a pore size between about 100 nanometers and about 5 microns. In embodiments where the negative template structure is constituted by $SiO_2$, the negative template structure can be completely removed, for example, by etching the structure with HF diluted in ethanol or water to a weight percent of about 1–10%. In the event that elemental silicon is the desired composition for the final positive crystalline structure, HF etching is feasible due to the greater resistance of elemental silicon to HF. Other combinations of compositions for positive and negative template structures will accordingly dictate suitable etching solutions.

FIG. 7 illustrates an alternative method 700 according to the present invention. According to method 700, a negative template periodic glass or oxide structure is produced that can withstand high temperatures and having utility as a mold. Such negative template structure can then be used for producing a positive final crystalline structure composed of a material having a high refractive index and having interconnected macroscopic pores. In this embodiment, the negative template structure is directly produced from a photosensitive medium, without the need to first prepare a positive template polymeric mold for its fabrication. Although FIG. 7 broadly relates to glass precursors, the discussion below is directed to the exemplary use of silicon-containing precursors.

According to this method, a starting medium comprising silicon-containing precursors and including photosensitive reagents is prepared at step 710. The silicon-containing precursors can either themselves be photosensitive, or they can be dispersed in a photosensitive material. Such photo-exposure induces either photopolymerization or photodecomposition of the material. Mixtures of silicon-containing photosensitive materials and other photosensitive materials can also be used. The starting medium further includes a photosensitive reagent capable of being activated by electromagnetic radiation of a suitable wavelength, such as visible light, that can thereby photo-chemically yield reaction products themselves capable of directly or indirectly inducing localized polymerization or decomposition of the starting medium. This photosensitive reagent may itself also, if desired, comprise silicon. Products of the photo-chemical reactions induce localized polymerization of the starting medium, deprotection of reactive sites, or crosslinking of functional groups of reagents in the starting medium. The starting medium components are uniformly dispersed in a suitable solvent, such as, for example, tetrahydrofuran.

In one embodiment, a polymerizable silicon-containing compound, oligomer or polymer is used for preparation of a starting medium. Such an exemplary starting medium further includes a non-nucleophilic solvent and a uniform density of dispersed photo-sensitizer molecules and initiator complexes. The classes of polymers to be produced from such polymerizable starting media can include, for example, acrylates, methacrylates, random or block copolymers, and epoxides. Other random or block copolymers can also be used.

Figure 8A:
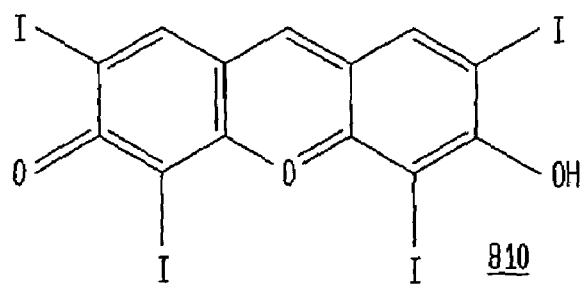
FIGS. 8A–C show various sensitizer compounds that can be used according to the methods of the present invention.
Figure 8B:
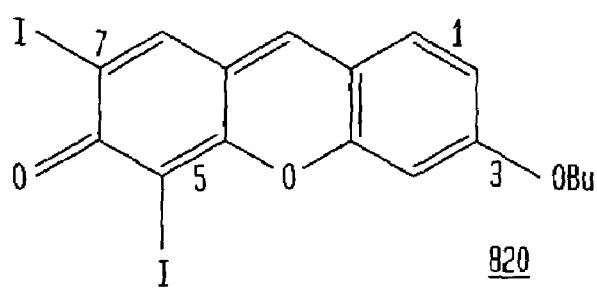
Figure 8C:
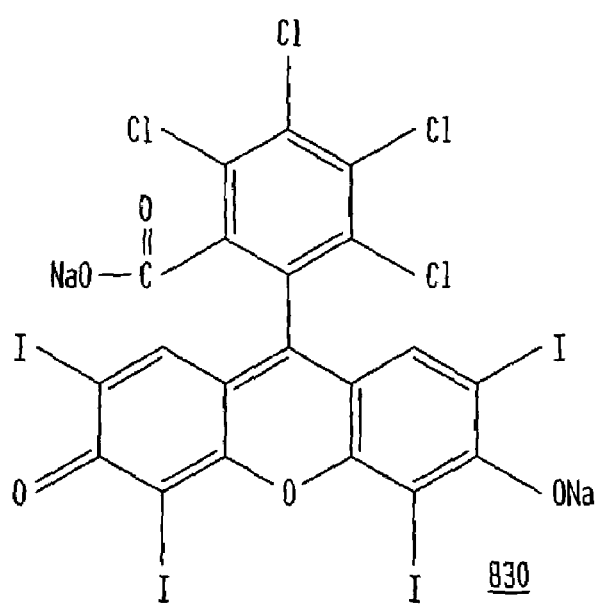

FIGS. 8A, 8B and 8C respectively show various exemplary sensitizer compounds 810, 820 and 830. The sensitizer compounds 810–830 are xanthene dyes that are activated by visible light. In FIG. 8B, "OBu" represents a t-butoxy group. The dyes 810 and 820 are optimally activated by light having wavelengths of about 535 nm and 470 nm, respectively. These dyes 810 and 820 are available from Spectra Group Limited, Inc., 1722 Indian Wood Circle, Suite H, Maumee, Ohio 43537, under respective product names HNu-535 and HNu-470. HNu-535, for example, is 2,4,5,7-tetraiodo-6-hydroxy-3-fluorone. The dye 830, known in the art as Rose Bengal, is optimally activated by light having a wavelength of about 560 nm and is commercially available from the Aldrich Company, P. O. Box 2060, Milwaukee, Wis. 53201.

Figure 9A:
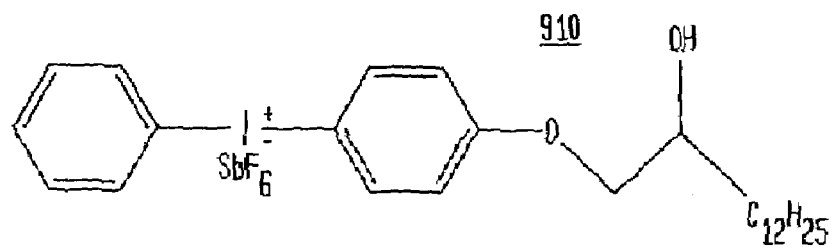
FIGS. 9A–B show various ionic initiator complexes that can be used according to the methods of the present invention.
Figure 9B:
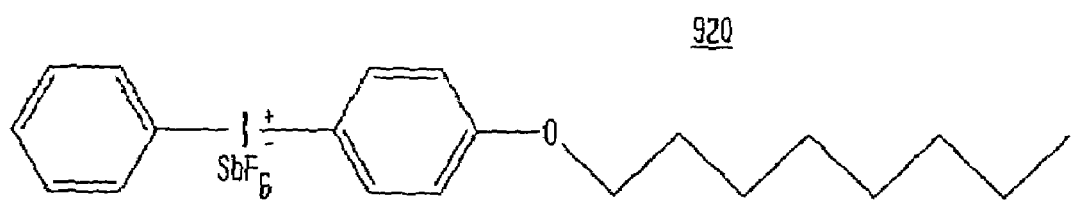

FIGS. 9A and 9B show exemplary ionic initiator complexes 910 and 920, which are photoacid generators (PAGs). The ionic initiator complex 910 is diaryliodionium hexafluoroantimonate, and is commercially available from Sartomer Inc., Oaklands Corporate Center, 502 Thomas Jones Way, Exton, Pa. 19341, under the product name SarCat® SR1012. The ionic initiator complex 920 is commercially available from UCB Chemicals Corp., 2000 Lake Park Drive, Smyrna, Ga. 30080, under the product name OPPI.

In one embodiment, silicon-containing multi-functional acrylate, methacrylate, styrene or epoxy polymers having an average molecular weight of about 5,000 to about 20,000 g/mole are used.

Figure 10:
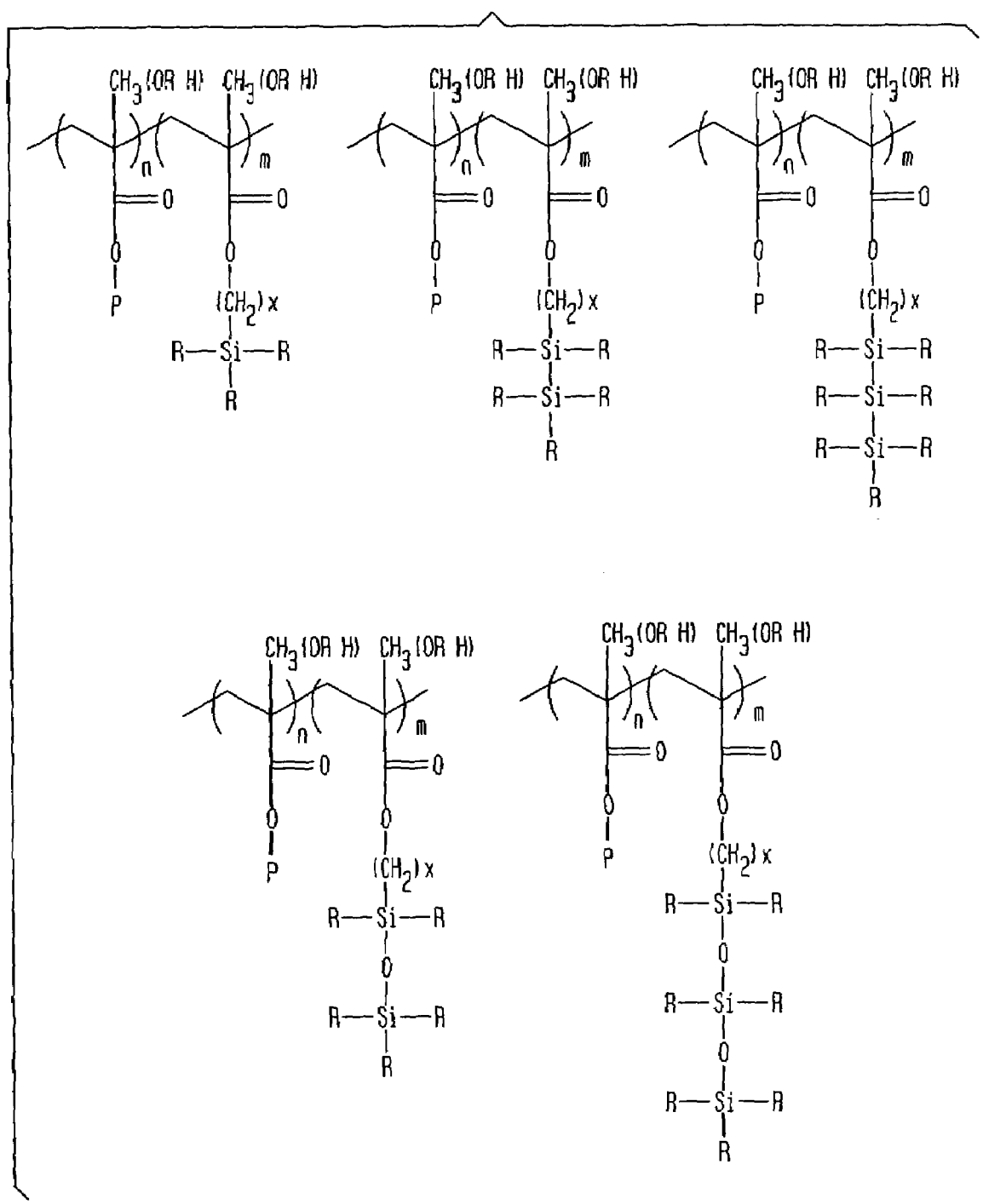
FIG. 10 shows various silicon(e)-containing acrylate and methacrylate polymers that can be used according to the methods of the present invention.

Exemplary silicon-containing acrylate and methacrylate polymers are shown in FIG. 10. In the illustrated formulas, R may be, for example, $CH_3-$, $-CH_2CH_3$, $-H$, $-OCH_3$, $-OCH_2CH_3$, $-OSi(R)_3$, -phenyl, or a higher functional hydrocarbon optionally with further silicon substituents. X is 0, 1, 2, 3 or a higher integer. P is an acid protection group such as t-butyl, tetrahydropyranyl, trimethylsilane, or hexamethyldisilane. The variables n and m represent the relative proportions of the indicated moieties present, each ranging from 0–100% as desired.

Figure 11:
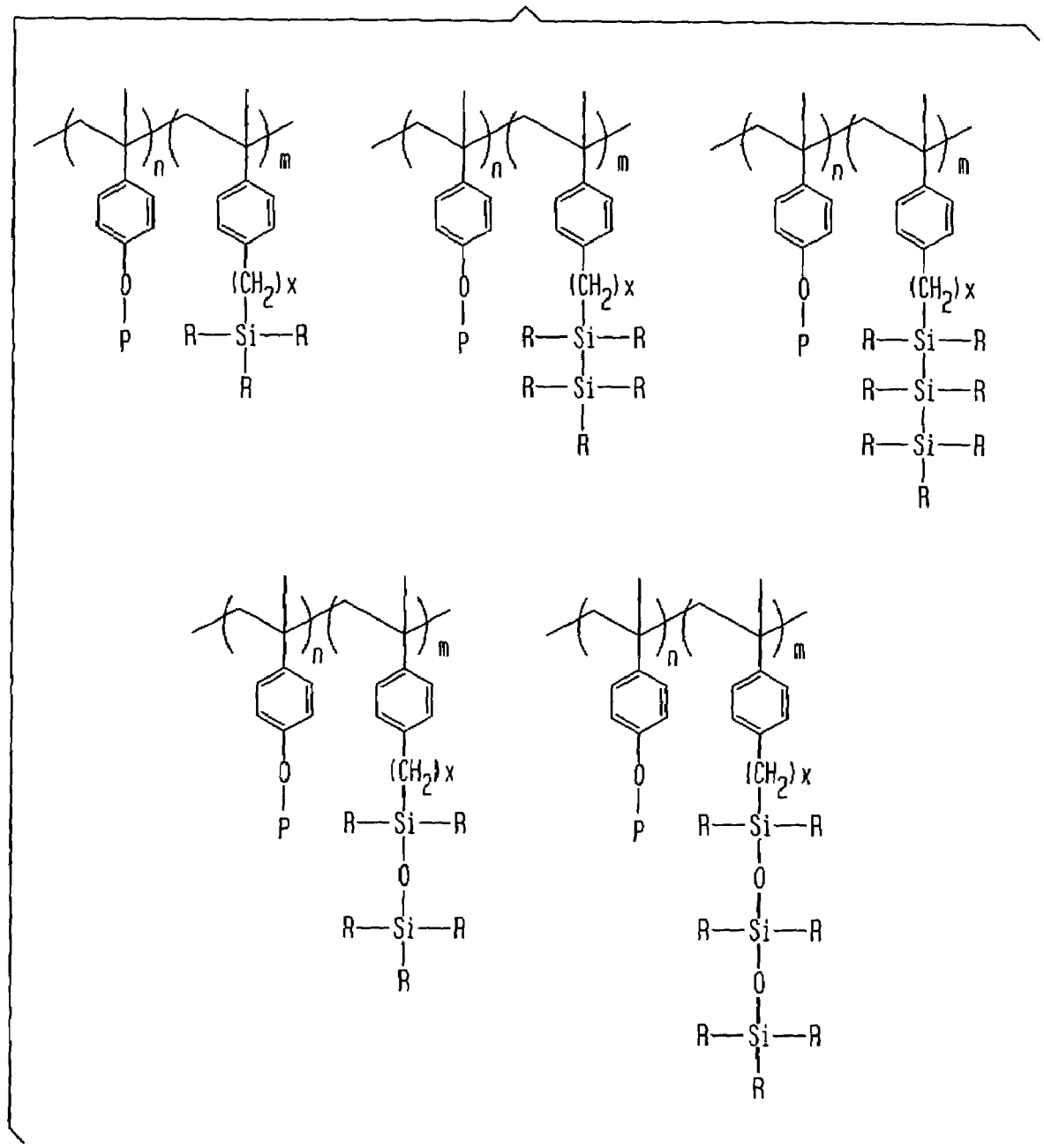
FIG. 11 shows various silicon(e)-containing styrenic polymers that can be used according to the methods of the present invention.

Exemplary silicon-containing styrenic polymers are shown in FIG. 11. In the illustrated formulas, R may be, for example, $CH_3-$, $-CH_2CH_3$, $-H$, $-OCH_3$, $-OCH_2CH_3$, $-OSi(R)_3$, -phenyl, or a higher functional hydrocarbon optionally with further silicon substituents. X is 0, 1, 2, 3 or a higher integer. P is an acid protection group. The variables n and m represent the relative proportions of the indicated moieties present, each ranging from 0–100% as desired.

In another embodiment, silicon-containing multi-functional epoxy, acrylate, methacrylate, or styrene oligomers having an average molecular weight of about 200 to about 1,000 g/mole are used.

Figure 12:
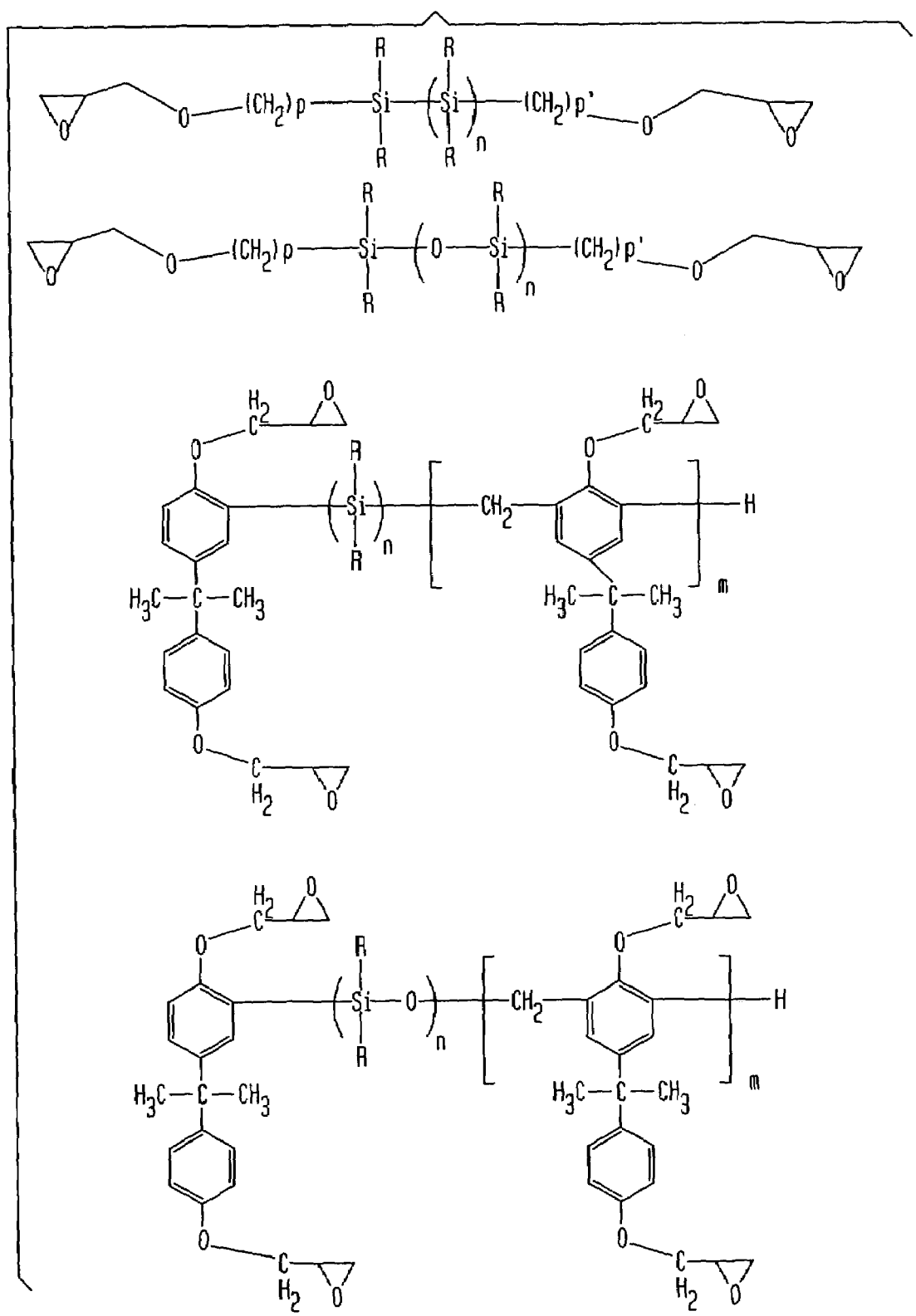
FIG. 12 shows various silicon(e)-containing epoxy oligomers that can be used according to the methods of the present invention.

Suitable exemplary silicon-containing epoxy oligomers are shown in FIG. 12. In the illustrated formulas, R may be, for example, $CH_3$—, —$CH_2CH_3$, —H, —$OCH_3$, —$OCH_2CH_3$, —$OSi(R)_3$, -phenyl, or higher functional hydrocarbon optionally with further silicon substituents. M, n, p and p' each independently are 0, 1, 2, 3 or a higher integer. One suitable epoxy oligomer derivative of a bisphenol-A novolac is commercially available from Resolution Performance Products, 1600 Smith Street, 24th Floor, P.O. Box 4500, Houston, Tex. 77210-4500, under the product name EPON™ SU-8.

Figure 13:
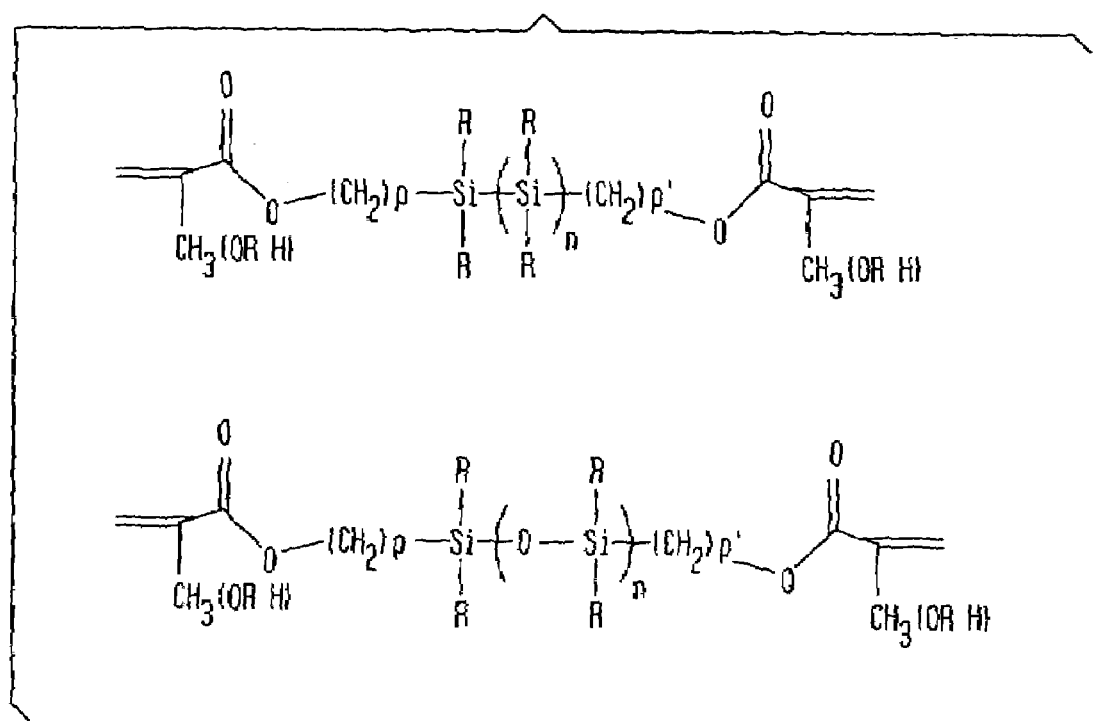
FIG. 13 shows various silicon(e)-containing acrylate and methacrylate oligomers that can be used according to the methods of the present invention.

Exemplary silicon-containing acrylate and methacrylate oligomers are shown in FIG. 13. In the illustrated formulas, R may be, for example, $CH_3$—, —$CH_2CH_3$, —H, —$OCH_3$, —$OCH_2CH_3$, —$OSi(R)_3$, -phenyl, or higher functional hydrocarbon optionally with further silicon substituents. N is 1, 2, 3 or a higher integer. P and p' each independently are 0, 1, 2, 3 or a higher integer.

In yet another embodiment, polymerizable silicon-containing monomers are used. In general, the silicon-containing monomers discussed earlier are suitable. In another embodiment, an inorganic silicon-containing compound such as ground $SiO_2$ is dispersed in a starting medium.

Referring next to step 720 of FIG. 7, a volume of the starting medium is prepared, for example by spin coating or casting a film of the starting medium on a rigid transparent substrate. After the spin coating or casting, the film is prebaked to evaporate out the solvent, at a temperature too low to induce substantial polymerization or deprotection.

In one embodiment, two separate steps 730 and 740 are next provided to define the polymerized regions of the negative template structure. In the first of these steps 730, an optical interference pattern produced by combining a plurality of mutually coherent beams of light of a particular wavelength exposes the starting medium, catalyzing localized photo-chemical reactions without causing polymerization or deprotection and hence without causing significant changes to the starting medium's refractive index. This exposure can be controlled to deliver, for example, about 1 joule per square centimeter for about 1 second. The exposure step 730 is carried out at a moderate temperature that inhibits or prevents polymerization. In the second step 740, a heat treatment induces generation of a catalyst which then initiates a localized chemical reaction in the starting medium, thereby polymerizing or deprotecting and thereby changing the refractive index of the starting medium in the localized regions that were exposed by the optical intensity pattern. The catalyst may be, for example, highly acidic free $H^+$ ions produced by the earlier exposure. Since the first step 730 does not initiate refractive index changes, the initial clarity of the negative template pattern in the starting medium is not degraded during the exposure step 730.

Figure 14A:
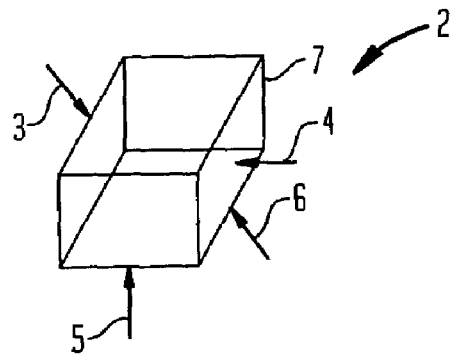
FIG. 14A shows a setup for producing an optical intensity pattern in order to carry out the methods of the present invention.

FIG. 14A shows a setup 2 for producing the optical intensity pattern needed in exposure step 730, with multiple laser light beams 3, 4, 5, and 6. The beams 3–6 are mutually coherent and thus coherently interfere to produce an optical pattern with periodic intensity variations in three independent directions. Exemplary beams 3–6 pass through (1,1,5), (1,5,1), (5,1,1), and (3,3,3) directions in a coordinate system where the starting medium 7 is located at the coordinate origin (0,0,0).

Figure 14B:
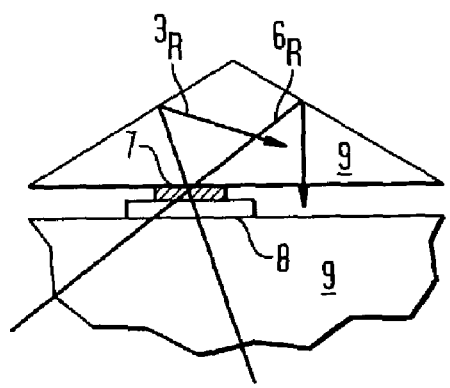
FIG. 14B shows a starting medium and supporting substrate disposed between glass prisms in order to carry out the methods of the present invention.

Referring to FIG. 14B, to ensure that the 3D optical intensity pattern is defined by the four beams 3–6, the starting medium 7 and supporting substrate 8 are preferably disposed between thick transparent glass prisms 9. The prisms 9 are shaped and positioned to stop reflected light rays $3_R$–$6_R$ from returning to the starting medium 7 and thereby further exposing the starting medium 7 in unintended regions. Alternatively, the refractive indices of the starting medium 7 and the supporting substrate 8 may be matched, and a film of hydrocarbon oil can be interposed between the starting medium 7 and the supporting substrate 8 to prevent reflection by the substrate.

Figure 15:
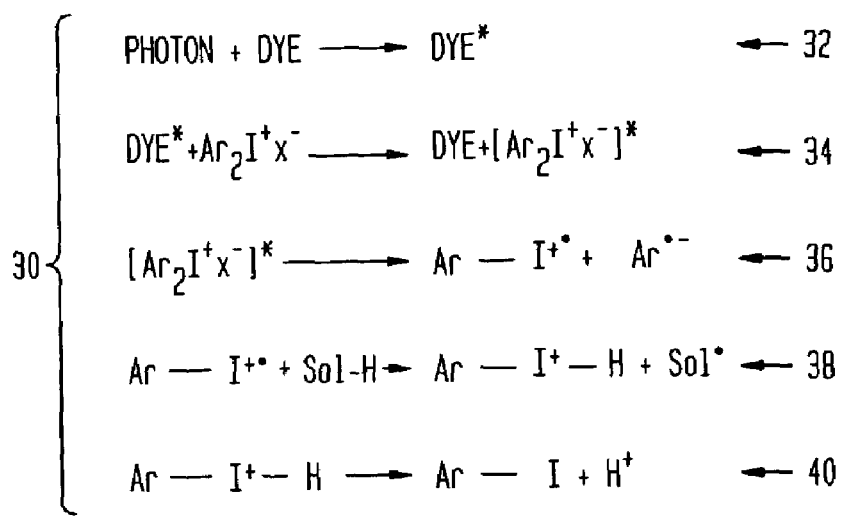
FIG. 15 shows photo-reactions that are initiated by exposing a starting medium to light in carrying out the methods of the present invention.

Referring to FIG. 7, the exposed regions of the starting medium are then polymerized in step 740. FIG. 15 shows exemplary photo-reactions 30 that are initiated by exposing the starting medium to light with a wavelength of 514 nm. The exemplary starting medium includes the sensitizer compound 810 shown in FIG. 8A and the ionic initiator complexes 910 shown in FIG. 9A.

The reactions start with the production of an activated molecule of dye* by absorption of a photon of 514 nm light by the molecule of dye, at reaction 32. The activated molecule of dye* transfers energy to an ionic initiator complex, $Ar_2I^+X^-$, to produce an activated ionic initiator complex, $Ar_2I^+X^{-*}$, shown as reaction 34. The activated ionic initiator, $Ar_2I^+X^{-*}$ subsequently decays to produce a pair of free radicals $ArI^+X^{\bullet}$ and $Ar^{-\bullet}$, shown as reaction 36. One of the free radicals, $ArI^{+-\bullet}$, reacts with a hydrogen atom in a solvent molecule indicated as Sol-H, to produce a complex $ArI^+XH$ and a free radical, $Sol^{\bullet}$, shown as reaction 38. The complex $ArI^+XH$ is unstable and decays to produce a highly reactive acidic free hydrogen cation $H^+$, shown as reaction 40. The sequence of photo-reactions 30 thermodynamically favors rapid production of $H^+$ ions. These ions are then available for reaction with polymerizable reagents as discussed with regard to step 740.

During exposure step 730 of FIG. 7, the temperature of the starting medium is kept relatively low to prevent and inhibit polymerization reactions between polymerizable reagents. Temperatures that are lower than the glass-like to rubber-like transition temperature of the selected starting medium, for example, below 65° C., are low enough for this purpose. Below the glass transition temperature, there is little free volume for polymerizable oligomers to perform rotational movements that are needed for their polymerization. At such temperatures, the $H^+$-ions produced by the photo-reactions 30 of FIG. 15 are also thereby prevented from diffusing through the starting medium. As a result, the $H^+$-ions do not significantly catalyze polymerization of the polymerizable oligomers at such temperatures, and such ions remain locally distributed in the regions of the starting medium positively exposed by the optical interference pattern.

Figure 16:
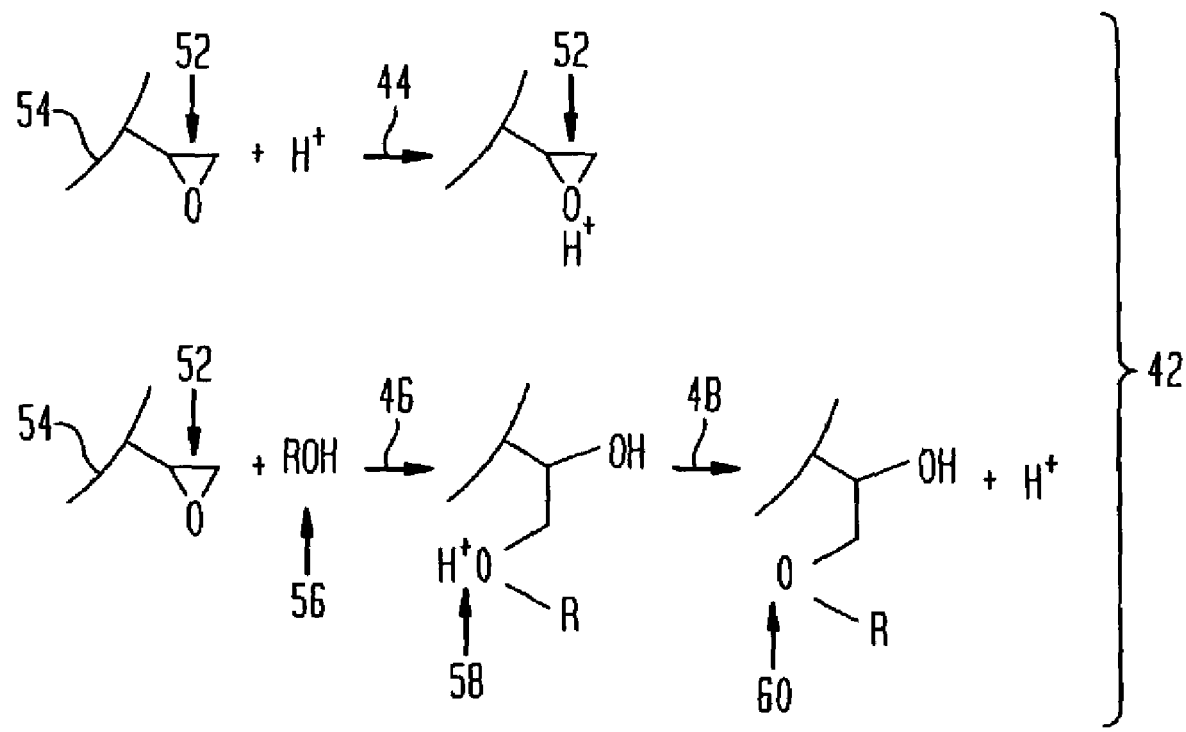
FIG. 16 shows a sequence of polymerization reactions catalyzed in a starting medium containing epoxy functional groups in carrying out the methods of the present invention.

FIG. 16 shows an exemplary sequence of polymerization reactions 42 that are catalyzed by $H^+$-ions in a starting medium that includes the epoxide oligomers 21 shown in FIG. 12. The polymerization reactions are favored under the elevated temperature conditions present during polymerization step 740 in FIG. 7.

A cycle of the sequence of polymerization reactions 42 starts when an $H^+$-ion attacks the epoxide ring 52 of an oligomer 54 shown as reaction 44. After being protonated, the oxygen of the epoxide ring 52 undergoes nucleophilic attack by a hydroxide moiety of R—OH molecule 56, shown as reaction 46. Exemplary R—OH molecules are trace alcohol or water molecules absorbed in the starting medium. The nucleophilic attack produces a complex 58 in which the R-moiety from the second molecule is chemically bonded to the oxygen of the original epoxide ring 52. Subsequently, the complex 58 decomposes to regenerate a free $H^+$-ion and an alcohol molecule 60 with a hydroxide moiety, shown as reaction 48.

The sequence of polymerization reactions 42 generates molecule 60, which has a hydroxide moiety, and regenerates an $H^+$-ion. These two molecular entities are available for the next cycle of the sequence of reactions 42. In the next cycle, the R—OH molecule is the molecule 60 produced by the previous cycle. A single $H^+$-ion is thus capable of catalyzing many cycles of the sequence of reactions 42. Each cycle adds an additional oligomer to molecule 60 from the last cycle, thereby producing a growing polymer.

In each cycle, the protonated epoxy ring 52 of an oligomer 54 must properly align with the growing polymer, and the acidic $H^+$ ion must be close to the epoxy ring for reactions 46 and 44 to proceed. To produce the alignment, chain segments of the oligomers need great freedom to perform rotational motions. Such rotational motions are possible when the starting medium is in a rubber-like phase, that is when the temperature is above the temperature of transition to such a phase. In the rubber-like phase, there is more free volume in the starting medium, and the acidic $H^+$ cations are able to move close to the epoxy ring. Thus, polymerization only proceeds at temperatures significantly above the glass-rubber transition temperature.

Referring again to FIG. 7, method 700 exposes the starting medium at step 730 to three or four interfering light beams to produce the optical intensity pattern. The three or four light beams are not all coplanar, as best seen in FIG. 14A. Thus, the three or four light beams do not have completely coplanar polarizations. Due to the absence of coplanar polarizations, the beams produce patterns with nonzero constant background optical intensities when combined. If a starting medium is exposed with such a combination of light beams, the constant background optical intensity will produce a constant background polymerization structure, upon polymerization at step 740. Constant background polymerization structures are typically undesirable, because they are closed crystalline structures without interconnected pores. It is not possible to fill the pores of a negative template closed porous structure in order to produce a positive final crystalline structure, because the pores are not interconnected.

In order to avoid the nonzero background polymer density that results from nonzero constant background optical intensities generated in step 730, an appropriate concentration of neutralizer molecules preferably is dispersed in the starting medium prepared at step 710. The initial concentration of the neutralizer molecules is selected to be sufficient to neutralize the background density of polymerization catalyst, such as acidic free H+ ions, that will be produced by the multi-beam interference pattern, without completely stopping the polymerization reaction. If the polymerization catalyst is an acid such as $H^+$ ions, a base such as triethyl amine or N,N,2,4,6-pentamethylaniline is an appropriate neutralizer.

At step 740, the exposed starting medium is heated under conditions that favor polymerization of the starting medium in the vicinity of the acidic $H^+$ cations. This step is completed during the considerable time period during which the density pattern of reaction products resulting from step 730 continues to track the original light intensity pattern. Exemplary heating steps involve baking the exposed starting medium at a temperature higher than a temperature at which the starting medium 7 makes a transition from a glass-like phase to a rubber-like phase. For example, the exposed starting medium can be heated to a temperature between about 60° C. and about 300° C., or preferably between about 100° C. and about 200° C., for a time period of about 1 minute to 4 hours.

In the higher temperature rubber-like phase, rotational motions by oligomers or polymers of the starting medium 7 and by groups of said oligomers or polymers significantly increase. This increased motion produces larger free volumes in the starting medium 7 and allows polymerization reactions to proceed. The high temperatures and larger free volumes enable the reaction products that were earlier produced when the sensitizer molecules were exposed to the optical intensity pattern, to catalyze or stimulate polymerization or crosslinking reactions. Thus, the distribution of polymerized oligomers tracks the original optical intensity pattern that exposed the starting medium. These polymerized products of the catalyzed or stimulated reactions change the refractive index of the starting medium in regions where the polymerizations occur. Thus, polymerization step 740 produces a refractive index pattern with a 2D or 3D crystalline symmetry in the exposed starting medium.

In another embodiment, step 730 desirably includes, following exposure to the optical interference pattern, the use of a focal region of a converging light beam to sequentially expose one or more desired points and lines in the starting medium. The light of the converging beam for this desirable additional treatment has a longer wavelength than the light used in the interference pattern exposure of step 730. The longer wavelength enables the converging light beam to only activate photo-sensitizer molecules through two-photon or other multiple-photon processes. Such processes only occur at significant rates in the high intensity focal region of the converging light beam. For this reason, the converging beam functions as a writing instrument that enables exposing small points and fine lines with sub-wavelength resolution in the starting medium. Such points and lines induce corresponding defects in the periodic pattern of the final positive macroscopically porous crystalline structure. When the final product is used as a band gap structure, such predetermined defects can serve as optical channels for transporting optical signals through the structure or as point-defects for providing couplings between various optical channels.

Referring now to step 750 of FIG. 7, the starting medium is then washed with a solvent that dissolves away the unpolymerized portions of the starting medium. Any solvent suitable to dissolve the unpolymerized reagents but to which the polymerized structure is resistant, can be used. A suitable solvent for epoxide reagents, for example, is propylene glycol methyl ether acetate. This step effectively replaces unpolymerized reagents with solvent in the positive regions of the crystalline structure. The washing may be facilitated by agitation, for example by using an ultrasonic bath.

The washed polymerized structure preferably is then dried. The drying conditions are selected to limit surface-tension stresses that the solvent applies to the porous polymeric structure during drying. Such surface-tension stresses could otherwise destroy the fragile macroscopic porous crystalline structure. One method for limiting such internal stresses during drying takes advantage of critical properties of liquids. In this method, the absorbed solvent is first replaced by liquid carbon dioxide. Replacing the solvent involves placing the washed polymerized structure in liquid carbon dioxide under pressure adequate to maintain the liquid state. The liquid carbon dioxide diffuses into the structure thereby replacing absorbed solvent without drying the porous structure. After replacing the solvent with liquid carbon dioxide under pressure, the temperature of the porous structure is raised to carbon dioxide's critical point at 31.06° C., and the pressure is gradually reduced to atmospheric pressure. The carbon dioxide is then allowed to diffuse out of the porous structure. Since carbon dioxide has no surface tension at its critical point, the diffusion of carbon dioxide out of the interconnected porous structure does not produce internal surface-tension stresses.

Referring to FIG. 7, decomposition of this structure by oxidation at step 760 eliminates all of the carbon and hydrogen, leaving behind the silicon in the form of silicon dioxide, or $SiO_2$. Such decomposition can be carried out in the same manner as discussed in connection with step 150 of FIG. 1. The resulting structure is constituted by negative template porous $SiO_2$ as a reversed structure of the desired positive final crystalline structure having interconnected macroscopic pores with high refractive index contrast. As indicated at step 770, the external pores of the structure are preferably then opened in the same manner as discussed in connection with step 160 of FIG. 1.

This negative template structure can be utilized to produce a positive final porous structure with a high refractive index contrast. As indicated by steps 780 and 790 of FIG. 7, this may be carried out in the same manner as discussed above in connection with steps 170 and 180 of FIG. 1. The resulting product is a positive final crystalline structure composed of a high refractive index material containing interconnected macroscopic pores.

The final positive crystalline structure is useful for a variety of photonic applications, including waveguides, splitters, optical insulators, optical filters, microcavity lasers, optical switches, routers, and other photonic band gap applications. Particular design considerations for photonic band gap materials are known in the art, as reflected for example in J. D. Joannopoulos et al., *Photonic Crystals*, Princeton University Press (1995), the entirety of which is hereby incorporated by reference. See also, Russell, P. S. J., "Photonic Band Gaps," *Physics World*, Vol. 37, August 1992; Amato, I., "Designing Crystals That Say No to Photons," *Science*, Vol. 255, p. 1512 (1993); and U.S. Pat. Nos. 5,600,483 and 5,172,267, the entireties of which are hereby incorporated by reference. Other applications include filters, catalysts, and biocompatible materials.

While the present invention is disclosed in the context of presently preferred embodiments, it will be recognized that a wide variety of implementations may be employed by persons of ordinary skill in the art consistent with the above discussion and the claims which follow below.

We claim:

1. A method of producing a glass structure having interconnected macroscopic pores comprising steps of:
   providing a photosensitive medium comprising glass precursors;
   exposing said medium to an optical interference pattern;
   polymerizing or deprotecting the portions of said medium exposed to said optical interference pattern, leaving other unpolymerized or protected portions;
   removing unpolymerized or deprotected portions of said medium; and
   decomposing said medium to produce a glass structure having interconnected macroscopic pores.

2. The method of claim 1, further including the step of opening surface pores on said glass structure.

3. The method of claim 1 further including the step of filling pores of said glass structure with a material having a high refractive index to yield an interpenetrating structure.

4. The method of claim 1 in which said glass precursors include silicon.

5. The method of claim 3 in which said step of filling pores is carried out by chemical vapor deposition.

6. The method of claim 3 in which said material is filled into pores of said glass structure at a temperature of at least about 400° C.

7. The method of claim 3 in which said material has a refractive index of at least about 3.0.

8. The method of claim 3 in which said material is selected from the group consisting of: silicon, tellurium, gallium arsenide, gallium nitride, indium phosphide, aluminum nitride, indium nitride, gallium antimonide, indium antimonide, aluminum antimonide, aluminum gallium nitride, aluminum gallium arsenide, aluminum gallium antimonide, gallium aluminum antimonide, indium gallium antimonide, gallium arsenic antimonide, indium gallium phosphide, indium gallium arsenide, indium arsenic antimonide, indium gallium arsenide phosphide, indium aluminum gallium arsenide, indium aluminum gallium nitride, indium aluminum gallium antimonide, lead sulfide, cadmium selenide, tin sulfide, cadmium sulfide, zinc selenide, bismuth, and selenium.

9. The method of claim 3 further including the step of removing said glass structure from said interpenetrating structure.

10. The method of claim 6 in which said material is filled into pores of said glass structure at a temperature of at least about 500° C.

11. The method of claim 1 in which removing unpolymerized or deprotected portions of the medium includes washing the medium with a solvent and then replacing the solvent by liquid carbon dioxide.

12. The method of claim 1 in which the photosensitive medium includes a polymerizable silicon-containing monomer, oligomer or polymer.

13. The method of claim 1 in which the photosensitive medium includes a silicon-containing multi-functional acrylate, methacrylate, styrene or epoxy polymer having an average molecular weight within a range of between about 5,000 g/mole and about 20,000 g/mole.

14. The method of claim 1 in which the photosensitive medium includes a silicon-containing polymer having a structure selected from the following group:

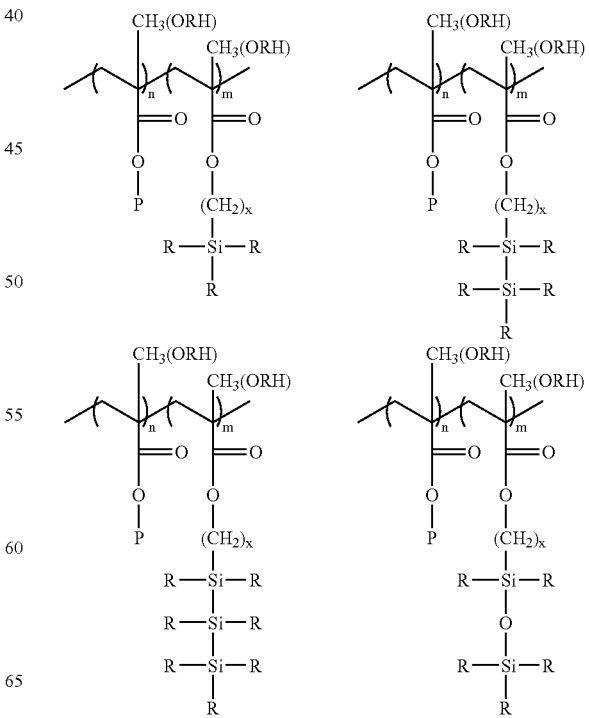

-continued

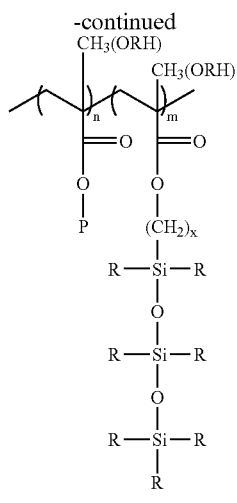

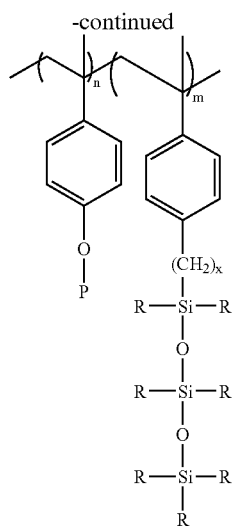

in which R is selected from the group consisting of —CH$_3$, —CH$_2$CH$_3$, —H, —OCH$_3$, —OCH$_2$CH$_3$, —phenyl, —OSi—(CH$_3$)$_3$, —OSi—(CH$_2$CH$_3$)$_3$, —OSi—(H)$_3$, —OSi—(OCH$_3$)$_3$, and —OSi—(OCH$_2$CH$_3$)$_3$; x is an integer; P is an acid protection group; and m and n are percentages adding up to 100%.

15. The method of claim 14 in which the acid protection group includes a moiety selected from the group consisting of t-butyl, tetrahydropyranyl, trimethylsilane, and hexamethyldisilane.

16. The method of claim 1 in which the photosensitive medium includes a silicon-containing polymer having a structure selected from the following group:

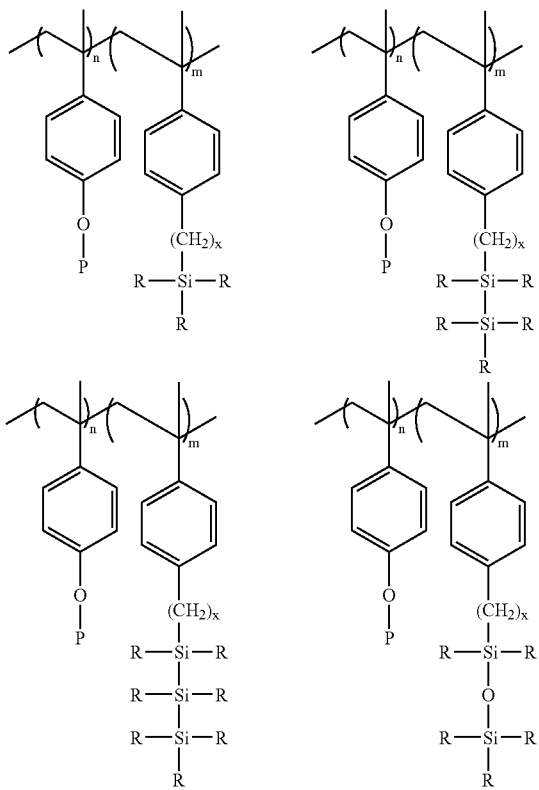

in which R is selected from the group consisting of —CH$_3$, —CH$_2$CH$_3$, —H, —OCH$_3$, —OCH$_2$CH$_3$, —phenyl, —OSi—(CH$_3$)$_3$, —OSi—(CH$_2$CH$_3$)$_3$, —OSi—(H)$_3$, —OSi—(OCH$_3$)$_3$, and —OSi—(OCH$_2$CH$_3$)$_3$; x is an integer; P is an acid protection group; and m and n are percentages adding up to 100%.

17. The method of claim 16 in which the acid protection group includes a moiety selected from the group consisting of t-butyl, tetrahydropyranyl, trimethylsilane, and hexamethyldisilane.

18. The method of claim 1 in which the photosensitive medium includes a silicon-containing multi-functional acrylate, methacrylate, styrene or epoxy oligomers having an average molecular weight within a range of between about 200 g/mole and about 1,000 g/mole.

19. The method of claim 1 in which the photosensitive medium includes a silicon-containing oligomer having a structure selected from the following group:

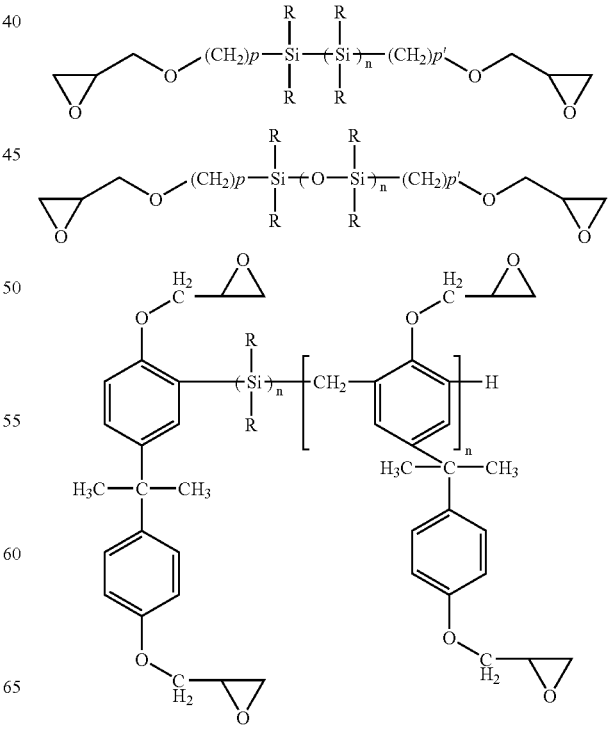

-continued

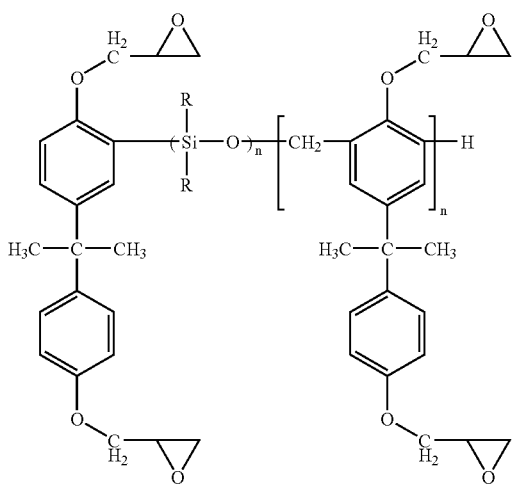

in which R is selected from the group consisting of —CH₃, —CH₂CH₃, —H, —OCH₃, —OCH₂CH₃, —phenyl, —OSi—(CH₃)₃, —OSi—(CH₂CH₃)₃, —OSi—(H)₃, —OSi—(OCH₃)₃, and —OSi—(OCH₂CH₃)₃; and M, n, p and p' each independently are integers.

20. The method of claim 1 in which the photosensitive medium includes a silicon-containing oligomer having a structure selected from the following group:

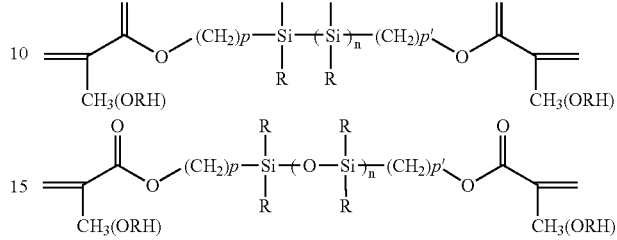

in which R is selected from the group consisting of —CH₃, —CH₂CH₃, —H, —OCH₃, —OCH₂CH₃, —phenyl, —OSi—(CH₃)₃, —OSi—(CH₂CH₃)₃, —OSi—(H)₃, —OSi—(OCH₃)₃, and —OSi—(OCH₂CH₃)₃; n is 1 or a higher integer; and p and p' each independently are integers.

* * * * *